(12) United States Patent
Pristash

(10) Patent No.: US 7,732,085 B2
(45) Date of Patent: Jun. 8, 2010

(54) INERTIAL PUMP FOR MOVING GASES IN A MICRO FUEL CELL

(75) Inventor: David J. Pristash, Brecksville, OH (US)

(73) Assignee: Pemery Corp., Brecksville, OH (US)

( * ) Notice: Subject to any disclaimer, the term of this patent is extended or adjusted under 35 U.S.C. 154(b) by 1380 days.

(21) Appl. No.: 11/090,365

(22) Filed: Mar. 25, 2005

(65) Prior Publication Data

US 2005/0214628 A1      Sep. 29, 2005

Related U.S. Application Data

(60) Provisional application No. 60/556,502, filed on Mar. 26, 2004, provisional application No. 60/566,438, filed on Apr. 30, 2004.

(51) Int. Cl.
| | |
|---|---|
| H01M 2/14 | (2006.01) |
| H01M 8/00 | (2006.01) |
| H01M 2/00 | (2006.01) |
| H01M 2/02 | (2006.01) |
| H01M 2/08 | (2006.01) |

(52) U.S. Cl. .............................. 429/38; 429/12; 429/13; 429/34; 429/35

(58) Field of Classification Search .............. 429/12–46
See application file for complete search history.

(56) References Cited

U.S. PATENT DOCUMENTS

| 4,385,494 A * | 5/1983 | Golben ..................... 60/528 |
|---|---|---|
| 2001/0045364 A1 | 11/2001 | Hockaday et al. |
| 2002/0009625 A1* | 1/2002 | Saito et al. .................. 429/26 |
| 2002/0119361 A1* | 8/2002 | Herrmann ................. 429/34 |
| 2003/0138679 A1* | 7/2003 | Prased et al. .............. 429/19 |
| 2004/0072040 A1 | 4/2004 | Duffy et al. |

\* cited by examiner

*Primary Examiner*—Dah-Wei D Yuan
*Assistant Examiner*—Steven Scully
(74) *Attorney, Agent, or Firm*—Schiff Hardin LLP

(57) ABSTRACT

A fuel cell device includes at least one and preferably two gas storage chambers, the gas storage chambers being connected via gas flow channels to a fuel cell membrane, such as a proton exchange membrane. A piston in each gas storage chamber moves to compress the gas upon being subject to an acceleration force. A flow control opens upon a predetermined condition being achieved to provide the compressed gases to a fuel cell membrane.

5 Claims, 15 Drawing Sheets

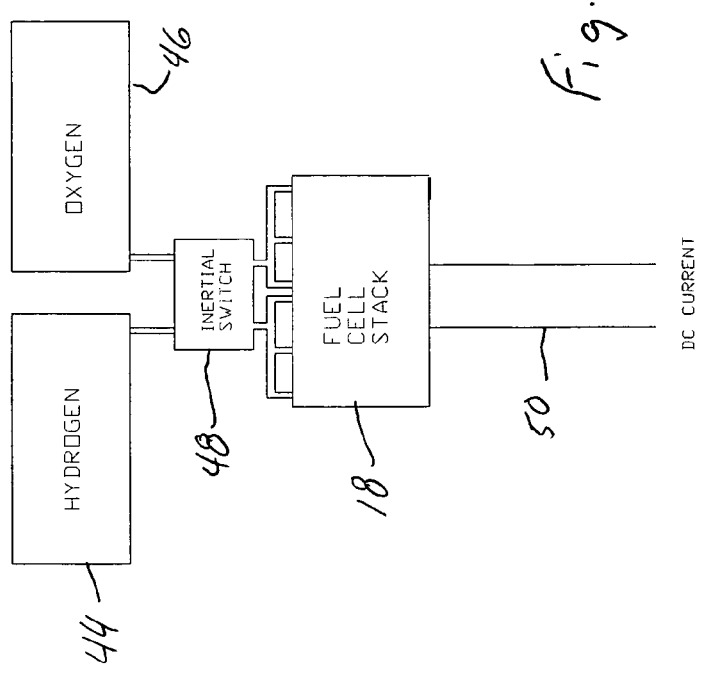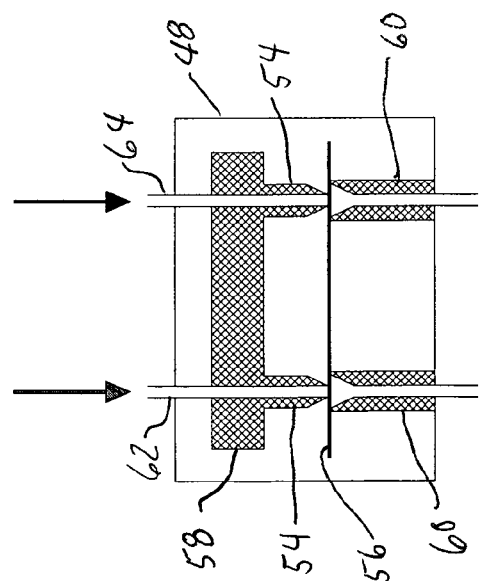

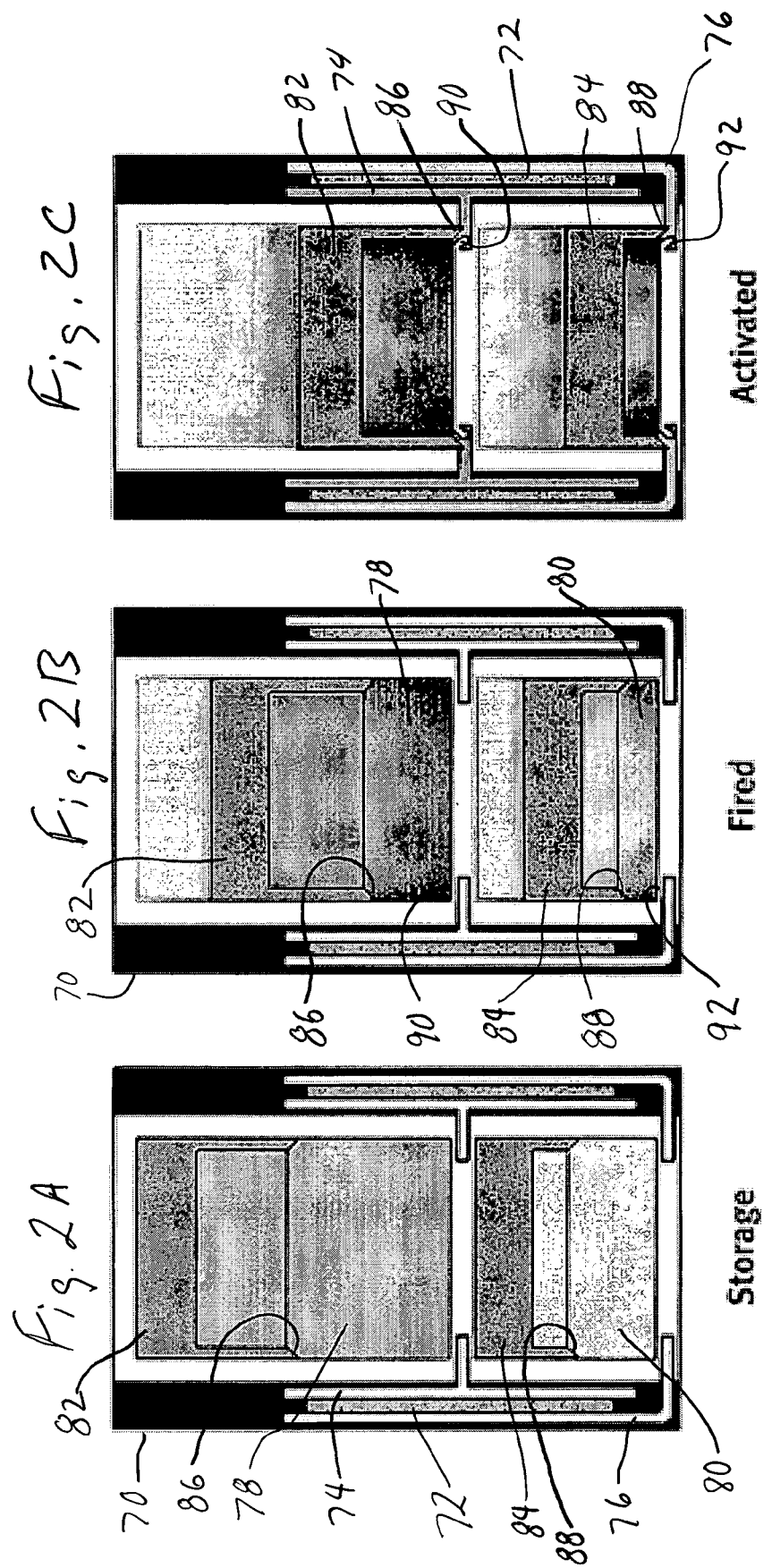

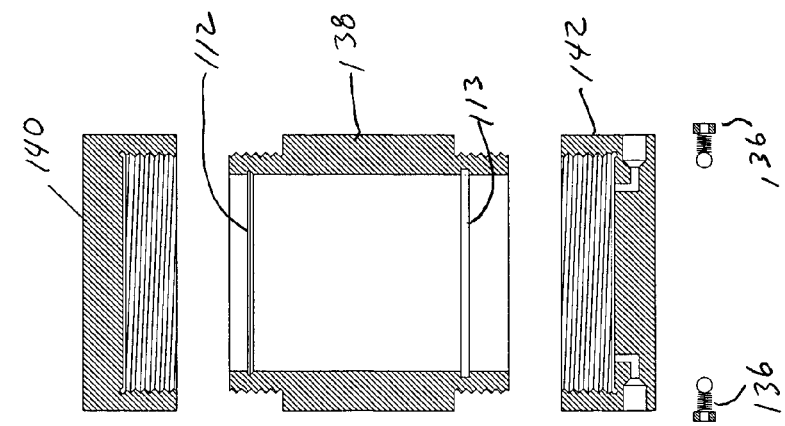
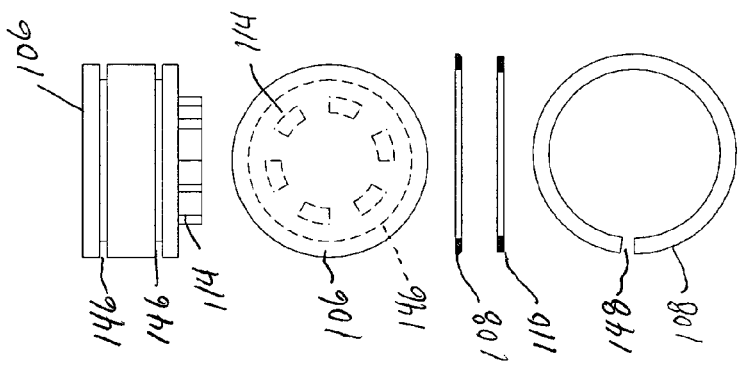
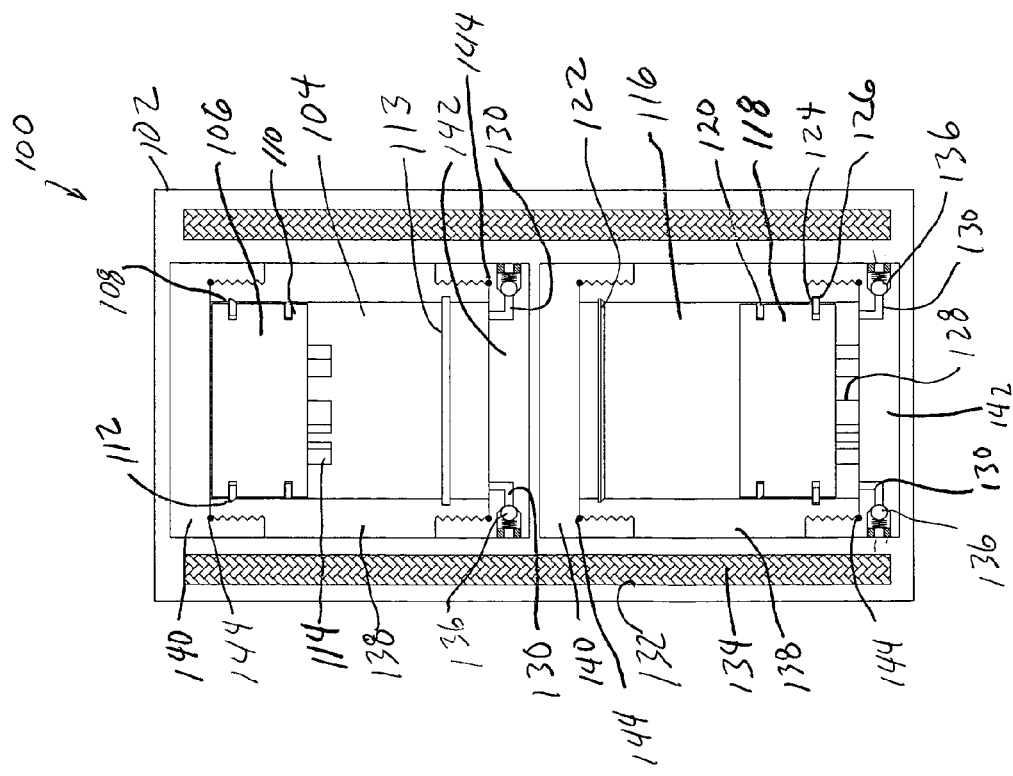

INERTIAL PUMP FOR MOVING GASES IN A MICRO FUEL CELL

CROSS-REFERENCE TO RELATED APPLICATIONS

This application claims the benefit of U.S. Provisional Patent Application Ser. No. 60/556,502, filed Mar. 26, 2004, and U.S. Provisional Patent Application Ser. No. 60/566,438, filed Apr. 30, 2004, both of which are incorporated herein by reference.

BACKGROUND OF THE INVENTION

1. Field of the Invention

The present invention relates generally to a fuel cell, and more particularly to a fuel cell having a pump or other gas transfer apparatus for moving gases in the fuel cell, as well as to a method for construction of and operation of a fuel cell.

2. Description of the Related Art

In a fuel cell, the chemical energy that is present in hydrogen and the oxidant (oxygen) is cleanly, quietly and efficiently converted electrochemically into electrical energy. The hydrogen is oxidized at the anode (negative pole) and the oxygen (or oxygen from the air) is reduced at the cathode (positive pole) of a single cell. The catalyst on the anode promotes the oxidation of hydrogen molecules into hydrogen ions (H+) and electrons: the hydrogen ions migrate through a special membrane to the cathode, where the cathode catalyst causes the combination of the hydrogen ions, electrons and oxygen to produce water. In this construction, the membrane is a polymer membrane so that the fuel cell is a so-called Proton Exchange Membrane Fuel cell (or PEMFC or PEM). The membrane conducts the hydrogen ions from one side to the other while blocking the free electrons but does so more efficiently when fully hydrated.

When connected to an electrical circuit, the electrical energy of the fuel cell produces a flow of electrons through the external circuit as electric current, which can be used, for example, to run a direct current (DC) electric motor. For utilization in an AC circuit, an inverter provides alternating current (AC) for those kinds of applications.

The electrodes may be formed by a thin layer of a catalyst applied to an appropriate backing placed on the opposite surface of the thin polymer membrane. Two bipolar plates are positioned against this backing, one on each side of the membrane. The bipolar plates have two functions: transmission of electrons through the elementary cells and release of heat to the external environment. The side of the bipolar plates facing the membrane electrode assembly (MEA) may be provided with ribs, which allow for the distribution of the gases (hydrogen and air) and the discharge of the resultant product water.

Increased power is achieved in fuel cell technology by enlarging the cell area (to handle an increase in the amperage requirements) and by combining a number of single cells in series to produce a fuel cell stack. The bipolar plates are configured to handle increased voltage requirements.

The several types of fuel cells are characterized by means of the electrolyte type. The electrolyte in between the electrodes defines the operating temperature of the fuel cell and a suitable catalyst can be selected for that operating temperature.

There is a major need for standby power for munitions production suitable for military applications. Munitions today are "smart" which means they have embedded electronics to aid in achieving hits on the desired targets. This use of electronics requires electricity to power the embedded hardware and software.

Currently, batteries and in particular lithium batteries are employed in most smart munitions. However, since munitions are generally produced during periods of non-use and are for later use during periods of conflict, storage or "shelf life" becomes a critical issue in this application. Batteries that are embedded in such devices must be capable of long term survival, requiring continued reliably for perhaps decades in storage, and generally under the most demanding environmental conditions. As an alternative, the batteries may need to be put into the munitions immediately prior to use of the munitions, not something one would want to do in combat. These batteries are called "reserve" batteries in the military.

Thermal reserve batteries are employed in some munitions but more commonly are used in bombs and missiles. The only difference in operating function between lithium batteries and thermal batteries is that thermal batteries are generally used for higher power applications. Beyond that, thermal reserve batteries are generally subject to the same demanding operating conditions as the lithium batteries.

U.S. Published Patent Application No. 2003 0152815 discloses microscopic batteries that are integrated or integratable with and provide internal power to MEMS (microelectromechanical systems) and integrated microcircuits, either on a retrofit or original manufacture basis. The MEMS involve the fabrication and use of miniature devices, which comprise microscopic moving parts (such as motors, relays, pumps, sensors, accelerometers, etc.). The MEMS devices can be combined with integrated circuits, and can perform numerous functions. For example, military applications for remote sensors and accelerometers include: safing and arming of fuses; friend or foe identification; embedded sensors for system integrity monitoring; communications systems monitoring, such as with satellites; low power mobile displays; flexible sensing surfaces; and numerous others. The microscopic batteries of patent publication application No. 2003 0152815 do not employ fuel cell technology due to the perceived limitation of providing sufficient power to drive the microdevices.

U.S. Pat. No. 6,506,513 and U.S. Published Patent Application No. 2003 0082421 each disclose a fuel cell assembly in which a fuel tank is located separate from the fuel cell and feeds the fuel to the cell via capillary action using a fuel permeating material U.S. Published Patent Application No. 2003 0129464 discloses a fuel cell assembly employing a separate fuel source which is rupturable by a needle for drawing out the fuel which is supplied to the fuel cell.

Although generators could be considered as standby power sources, their large size precludes them from all but the most energy intensive applications, so they are not normally considered where small size is necessary, but may be utilized when size is not a concern. Batteries in all their many types and sizes fill most short and medium shelf life niches with little problems. It's only where the shelf life requirements go into the decades that traditional batteries start to have failure issues because of their inherent chemical nature.

SUMMARY OF THE INVENTION

The present invention provides a fuel cell having at least one fuel chamber and a fuel pump mechanism to drive fuel from fuel chamber to the fuel cell. Preferably, the fuel chamber, fuel pump mechanism and the fuel cell are integrated into a single compact unit. The compact fuel cell may be used in various applications, one of which is for powering munitions.

Where munitions applications are concerned, micro fuel cell systems, including those utilizing polymer electrolyte membranes, face a myriad of issues relating to both operation and performance. The power source is subject to challenging G-forces, spin and shock influences and other impacts commonly encountered in a typical ordnance environment. These factors are best addressed by basic mechanical engineering and packaging design. Setting these aside, two critical issues remain which go to the very heart of developing a successful power source for a munitions product. The first is shelf life, or storage life, of the fuel cell. This speaks to its "readiness" or reliability. The second centers on the storage and operating environment of the munitions. This aspect speaks to the ability to "work" in harsh environments.

From the standpoint of, for example, the US Department of Defense military units, it is desired that the shelf life of the source of the electrical power last as long as the munitions themselves, perhaps as long as twenty or more years.

The environmental conditions that most impact electrical power sources are large temperature extremes. Cold temperature in particular is a major concern since full functionality may demand performance at temperatures reaching as low as −60 degrees below zero (F) or even colder. Intense heat, too, can be a powerful factor, but in polymer electrolyte membrane storage systems of the type discussed herein, heat is not as critical an issue. As disclosed below, the problems related to both shelf life and temperature extremes are solved using a mechanical method including the use of an inertial pump.

The present invention provides a fuel cell that will generate electricity after being in a standby mode for a long period of time, for example, many years, and also provides a method of construction such a fuel cell. In general usage, the standby mode is also referred to as the shelf life of a device.

BRIEF DESCRIPTION OF THE DRAWINGS

FIG. 1A is a schematic side view of a fuel cell stack, FIG. 1B is a functional block diagram of fuel storage tanks connected to a Polymer Electrolyte Membrane Battery fuel cell, and FIG. 1C is a side cross-section view of an inertial switch, according to one aspect of the present invention;

FIG. 2A is a side cross-sectional view of an inertial pump in accordance with the principles of the present invention shown in a storage position, FIG. 2B is a side cross-sectional view of the inertial pump of FIG. 2A shown in the fired position, and FIG. 2C is a side cross-sectional view of the inertial pump of FIG. 2A shown in the activated position;

FIG. 3A is a side cross-sectional view of a fuel cell assembly of the present invention according to a first embodiment, and FIG. 3B are side and plan views of components of the fuel cell assembly of FIG. 3A;

DETAILED DESCRIPTION OF THE PREFERRED EMBODIMENTS

Figure 4:
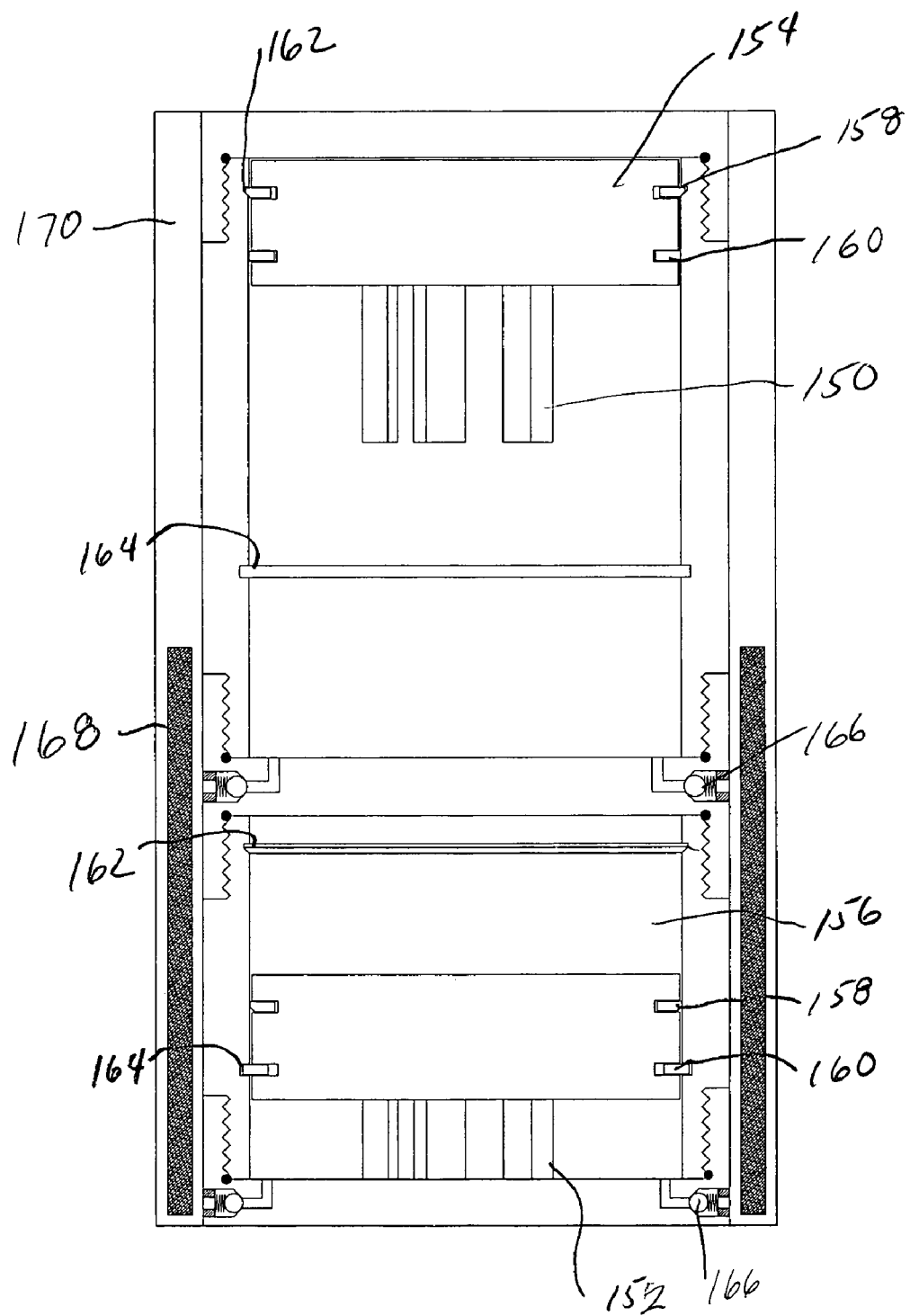
FIG. 4 is a side cross-sectional view of a second embodiment of the present fuel cell assembly.

In a preferred embodiment of the invention, the micro fuel cell includes three major features or components: (1) a polymer electrolyte membrane, or PEM fuel cell; (2) so-called nanotechnology storage tanks or miniature cells for hydrogen and oxygen to be relied upon by the fuel cell in generating electricity; and (3) a miniature or nanotechnology inertial switch, which are all assembled into a Polymer Electrolyte Membrane Battery (PEMERY).

In accordance with one aspect of the present invention, a device for providing the required components/ingredients such as hydrogen and/or oxygen, or other components to the fuel cell is disclosed. In particular, an inertial pump is provided that maintains the active energizing components or ingredients of a micro fuel cell is physically separate compartments, and maintains such separation until such time as power supplied by the fuel cell is needed, and accordingly, must be powered or electrified. Where a fuel cell system depends upon energizing components or ingredients in the form of gases, namely hydrogen and oxygen, these two gases are maintained apart by the arrangement of the inertial pump of the present invention. This is a very important aspect of this design, as the fuel cell must be kept in a dry or un-hydrated state to prevent damage during long-term storage. This is achieved by blocking any flow of hydrogen or the oxidant to the fuel cell prior to the time of use.

Another aspect of the invention is that by configuring the components it would be possible to use the water generated by the fuel cell conversion process to hydrate the PEM fuel cell. Hydration is required to get maximum efficiency of conversion. In this design the PEM fuel cell is stored dry to prevent damage, so that as a result the fuel cell will operate at a reduced capacity when first activated. The water generated by the initial start of conversion of fuel to electricity is used to hydrate the PEM cell thereby increasing the efficiency of the PEM fuel cell in conversion of hydrogen and oxygen to electricity.

Another aspect of the invention is in the design of the inertial pump to avoid "blow-by" of compressed gases upon activation of the inertial pump; while another aspect of the invention is in the design of the gas ports for the hydrogen and/or oxygen tanks in order to avoid the need for alignment guides for the activating piston.

In an embodiment of the invention, a topless construction of the activating piston enables more gas to be stored in the hydrogen and/or oxygen tank; while a further embodiment of the invention involves improvements to the tank design to utilize a center exhaust port that is sealed to the piston when not activated.

The improvements to the tank design also involve the use of various configurations of the hydrogen and oxygen tanks to achieve a balanced configuration while also providing for efficient exhaust of the gases at positions that enable rapid delivery of the hydrogen and oxygen to the fuel cell. The improvements to the tank design also involve providing coatings to the insides of the storage tanks that provide a more effective seal for the hydrogen tank, although it may be possible to provide a coating on the outside as well or in place of the interior coating.

FIGS. 1A, 1B and 1C illustrate the component fuel cell stack (FIG. 1A), an inertial switch (FIG. 1B), and the Polymer Electrolyte Membrane Battery (PEMERY) system of one aspect of the present invention. The micro fuel cell according to one example implementation of the present invention is a new product configured uniquely from several emerging technologies. Another aspect of the invention also involves the process of making the new product. The micro fuel cell includes three major features or components: (1) a polymer electrolyte membrane, or PEM; (2) so-called nanotechnology or miniature storage tanks or cells for hydrogen and oxygen to be relied upon by the fuel cell in generating electricity which may be activated to release the hydrogen and oxygen; and (3) a miniature or nanotechnology inertial switch, such as a G-force or acceleration force switch or a centrifugal-force switch. When assembled, these three features or components together present a very small package uniquely suitable for this application.

The first component of interest is the fuel cell. A fuel cell stack 18 is shown in FIG. 1A, including an anode end plate 20, a membrane electrode assembly 22, a bipolar plate 24, a second membrane electrode assembly 26, a second bipolar plate 28, a third membrane electrode assembly 30 and a cathode end plate 32. The anode 20 is connected through an electrical circuit 34, shown as a simple conductor in the figure, to the cathode 32. By providing hydrogen and oxygen 36 and 38, respectively, to the fuel cell stack 18 an electrical current is generated.

Current work on polymer electrolyte membrane (PEM) fuel cells has produced cells of 0.2 millimeters in thickness that can produce better than 0.5 ampere of current per square centimeter at 0.7 volts. Supporting structures will increase that size, and stacking of the cells would be required to deliver higher voltages. Through these recent advancements in PEM design, a remarkably small cell will generate voltages and currents as good as any existing or proposed battery.

Many methods of building fuel cell stacks (a series of fuel cells assembled together to achieve the desired voltage and amperage of the design) are possible. In embodiments of the present invention, the fuel cells are stacked end on end rather than one on top of the other. This allows for a thin but tall profile which fits the design and construction of the present fuel cell better than the more traditional arrangement of one cell on top of the other.

The elements of this PEM technology have developed to the point that appropriate and inventive packaging or assembling is all that is required. This invention depicts such a unique assembly and the method of making such an assembly. As promising as PEM fuel cell technology is in size reduction, it is the overall system that's important so any future development that also could be miniaturized would also work in this application.

The second component is storage of the fuel and oxidant required by the fuel cell. All PEM fuel cells, no matter how they are made, require a source of hydrogen and oxygen in order to operate. Typically, this supply must be proximate to the cell structure. To accomplish this in a miniaturized environment requires, in one embodiment of the invention, a corresponding miniaturization of conventional storage "tanks" made extremely small. In FIG. 1B, the fuel cell stack 18 is connected to a hydrogen supply 44 and an oxygen supply 46 through a switch 48, which here is an inertial switch. The resulting operation of the fuel cell stack 18 produces a DC current 50.

Alternatively, in another embodiment, these "tanks" may be constructed from very small blocks of material, which is honeycombed, or otherwise "tunneled." In other words, such blocks are infiltrated with micro channels, cavities, passages, sinuses or nano-tunnels functioning as one or more storage media. In a munitions application where only a very short active life is required, material can be constructed or otherwise provided with micro-cavities or nano tubes or tunnels affording adequate storage capacity for the hydrogen and oxygen required to run the fuel cell for a period of time sufficient to carry out its objectives.

The third critical component in the unique fuel cell structure and method is a connecting device 48 placed between the PEM cell assembly 18 and the two gas storage tanks 44 and 46. The purpose of this connecting device is to serve as a means for delivery of the stored hydrogen and oxygen to the proximity of the power generation portion of the cells such that the voltage generation can take place. Many equivalent variations of this connecting device are possible, for example, chemical, electrical, or mechanical switches are possible, but the preferred embodiment for a munitions application involves a mechanical inertial switch 48. The inertial switch 48, also referred to as a flow control switch, controls the flow of gases between the storage chambers and the fuel cell membrane. In the preferred application of the present device, inertial energy is utilized to operate the switch from a flow inhibiting position or condition to a flow permitting position or condition.

In its most basic form as shown in FIG. 1C, a mechanical inertial switch 48 includes two miniature sharp hollow probes 54 positioned above and/or adjacent to one or more membranes 56 (not the fuel cell membranes) respectively located so as to separate the fuel cell from each source of oxygen and hydrogen. The probes 54 are connected to a weight 58 that provides the inertial impetus for the probes to pierce the membrane 56. The membrane 56 is supported by a receiver 60 that permits the probes 56 to pierce the membrane where desired. Once the membrane 56 is pierced, gas flow channels 62 and 64 are opened to permit the passage of the fuel and oxygenator, which here is hydrogen and oxygen.

By design, each of the probes 54 is counterbalanced separately or jointly against movement (for example by a biasing force afforded by a spring or spring-like element, a resilient memory material, pneumatic pressure, or other similar and equivalent means) to generally and continuously (for long periods of time) maintain the probes in a first position that is adjacent to yet apart from respective blocking membranes (that are not the fuel cell membranes).

More recently, delicately designed micro-inertia switches have been developed; these too can be employed in this structural context. Upon the imposition of dynamic forces of movement, usually expressed in terms of G-forces or acceleration forces, sufficient to overcome the biasing force, the probes move against their respective membranes, thereby rupturing or penetrating the membranes. In this way, hydrogen and oxygen are released to flow to the fuel cell active area. A G-force or acceleration force may be experienced by the device during a sudden acceleration of the device, such as when fired by in an artillery round, or during sudden deceleration, such as upon impact by a moving object. When subject to sudden acceleration, the piston, due to its weight, tends to resist moving while the body of the device is accelerated. This drives the piston to the lower position. In an impact situation, the piston tends to keep moving while the body of the device is stopping, forcing the piston to the lower position. Proper orientation relative to the direction of travel is required to trigger the operation of the device. It is foreseeable to provide more than one of the present devices at different orientations to trigger operation from forces at different directions. The force to trigger operation can be set to different levels by selection of components and construction so that a greater or lesser force is required to initiate operation of the fuel cell. As such, the impact to start operation of the present fuel cell may be a plane crash so as to power an emergency beacon or a locator for the black box. The impact may be an automobile or other vehicle crash, where the fuel cell power is supplied to an emergency alert system. The impact or acceleration threshold may be set lower so that a user may trigger operation by striking or shaking the device. Far more possibilities exist for utilization of the present device, all of which are within the scope of this invention.

Since many applications of this micro fuel cell technology involve one-time use, no reset action is required. However, a reset mechanism and system may be provided in an alternative embodiment for either military or commercial applications.

Thus, presented herein is a new assembly, as well as a new and novel application of combined emerging nano-technologies, most particularly PEM fuel cells with micro-inertia switches. Many equivalent variations and modifications of these components are possible. Comparisons with currently used battery technologies in this field of application serve best to illustrate the properties of this invention.

A distinguishing feature of embodiments of the present fuel cell and method is that prior to activation (either purposeful or in response to inertial forces) there are no active processes going on as exist with respect to common batteries. Where traditional batteries are involved, such ongoing processes typically act to deplete a battery's capacity to perform when ultimately needed.

In the assembly described and illustrated in the FIGS. 1A, 1B and IC, all the components needed to run the device, and to generate electricity if and when needed, are separated by physical barriers. Since these barriers are generally stable by design, the shelf life of the unit is inherently very long. A life period of 15 to 20 years, or even twice that period, is not unreasonable. The only limitation would be the life of the materials utilized in building the fuel cell itself.

The present fuel cell and the method for its fabrication in its most basic form will have applications across a wide range of fields, from military ordnance systems to commercial signaling devices or detectors, and to space exploration where a power-up cycle may be called upon a year or even many years following a launch. Its miniature size makes the present fuel cell particularly suitable anytime and anywhere that space is limited, weight is critical and time to power-up may be considerably long.

In many applications, an inertia switch may be unnecessary. The inertial switch could be replaced with any other on/off device, giving the unit the ability to turn on and run for some period and then turn off again. This would give extended life to essentially any use, whether it is a military application or commercial in nature.

Alternatives exist for the gas storage means, as well. The objective is to supply the necessary hydrogen and oxygen to meet the power requirement parameters of the product being powered. Just as power classifications exist among AAA, AA, C and D size batteries, this also is true of the micro fuel cell unit, which may be designed specifically to meet certain power demand levels.

A high acceleration or inertial switch designed for military application could be replaced by a low acceleration or inertial force switch that would allow turning on a battery with a shake of the hand prior to use. According to embodiments of the invention, a replacement is provided for a D size battery that has no limit on the shelf life. However, in some applications switching the power supply on and off may be required, thus necessitating a reset switch incorporated into the present fuel cell.

Turning now to FIGS. 2A, 2B and 2C, a fuel cell having a compact configuration is provided at 70. The fuel cell 70 of FIG. 2A has a polymer electrolyte membrane 72 connected by flow channels 74 and 76 to adjacent storage chambers 78 and 80, respectively, for the fuel and oxygenator. The chambers 78 and 80 each have pistons 82 and 84 that include sharp probes 86 and 88 at the lower edges thereof. The fuel cell assembly 70 may remain in this configuration for significant periods of time.

Upon being subject to a sufficient inertial force, such as being fired from an artillery device, the fuel cell 70 moves through the state illustrated in FIG. 2B. Specifically, the piston 82 is moving downward (relative to the drawing) in the chamber 78 and thereby compressing the gas held therein. Similarly, the piston 84 is moving downward in the chamber 80 to compress the gas held in this chamber. The movement of the pistons 82 and 84 brings the sharp probes 86 and 88 toward sealing portions 90 and 92 in the respective storage chambers.

FIG. 2C shows the fuel cell 70 after the pistons 82 and 84 have reached the end of their travel within the storage chambers 78 and 80. The sharp probes 86 and 88 pierce the sealing portions 90 and 92 and permit the compressed gases in the chambers 78 and 80 to enter the channels 74 and 76. The gases reach the polymer electrolyte membrane 72 and initiate the generation of electricity from the fuel cell assembly. Electrical connections are provided from the polymer electrolyte membrane to exterior portions of the fuel cell assembly 70 so that the assembly 70 may be connected to an electrical circuit. The basic principle of operation of embodiments of compact fuel cells is thereby disclosed. Specific embodiments of fuel cells that generally operate according to these principles as presented herein below.

FIGS. 3A to 10 each illustrate an example implementation of an inertial pump for moving gases in a micro fuel cell system in accordance with another aspect of the present invention. In this regard, the inertial pump shown in these figures operate generally in a similar manner. Thus, their operation is described collectively hereinbelow. But first, the structural components of each will be described with reference to the figures.

In FIG. 3A, the fuel cell device 100 has a housing 102 that is configured to be the size and shape of a battery. The battery format may be AA, C or D size or other sizes and shapes but here is a D size battery form factor. The devices are cylindrical in overall shape, although other shapes are possible and are within the scope of this invention.

Inside the housing 102 is a hydrogen chamber 104 that includes a piston 106 that includes two piston rings 108 and 110. The piston 106 is movable within the chamber 104 and is shown in the storage position at the top of the chamber 104. The upper ring 108 is engaged in a channel 112 in the sidewall of the chamber 104. A second channel 113 is provided in the chamber sidewall at the opposite end of the chamber 104. A plurality of projections 114 extend from the bottom of the piston 106 to serve as a standoff to control the final volume of the gas. In particular, further piston movement is inhibited by the projections 114 striking the bottom of the chamber 104.

The housing also includes an oxygen chamber 116 at the lower end relative to the view of the figure. The lower chamber 116 is connected to the upper chamber and is mounted so that the chambers are coaxial of one another. The chambers need not be coaxial in every embodiment, but may be located at different locations relative to one another, including offset, side-by-side, or otherwise. The chambers are cylindrical in this embodiment, although they may be other shapes. The lower chamber 116 has a piston 118 that is shown in the activated or down position. This position is shown merely for purposes of illustrating the two positions of the pistons, since in operation generally both pistons are either in the upper storage position or both are in the lower activated position. In the lower position, the piston 118 has an upper piston ring 120 that has been disengaged from an upper channel 122 and has a lower piston ring 124 that has engaged with a lower channel 126. The engagement of the lower piston ring in the lower channel keeps the piston in the activated position even if the pressure of the compressed gas tries to push the piston up. Projections 128 as standoff structures on the bottom of the piston 118 abut or nearly abut the bottom of the chamber 116.

Both of the chambers 104 and 116 have gas flow channels 130 at the bottom of the chambers that lead to a compartment 132 in which is provided a PEM fuel cell membrane stack 134. The flow channels 130 from the two chambers 104 and 116 connect to opposite sides of the membrane stack so as to enable the fuel cell to operate. Check valves 136 are provided in each of the channels 130. The check valves 136 are the inertial switches, or flow control switched in this embodiment. Here, the check valves are provided with a spring biased ball bearing seated on a valve seat, although other valve constructions are possible as well. The ball bearing can be replace by any type of valve member that seats on the valve seat. The check valves 136 open at a predetermined gas pressure when the spring force is overcome and the ball bearing moves away from the valve seat. The opening of the check valve 136 permits the gas to pass from the chamber to the fuel cell membrane. Two such check valves 136 and channels 130 are shown in the drawing, although more or fewer may be provided. For example, a preferred embodiment includes four flow channels per chamber. The compartment 132 and the fuel cell stack 134 are wrapped around the gas chambers 104 and 116. A space is provided between the outer wall of the chambers and the fuel cell to collect and store wastewater resulting from the fuel cell process, if necessary.

The illustrated fuel cell has a gas storage capacity of 2.9 CC and provides an 8:1 compression ratio. To facilitate sealing of the chambers, the chambers are formed of a cylindrical main portion 138 with top and bottom caps 140 and 142 threaded thereon. An O-ring seal 144 is provided between the threaded connections.

FIG. 3B shows the components in exploded view, including the main portion 138 with the channels 112 and 113 if provided as the upper chamber, or 122 and 126 if provided as the lower chamber. For the sake of simplicity, only the reference characters for the upper chamber are used for the remainder of the discussion of this figure, although both sets of characters apply. The caps 140 and 142 thread on the main portion 138 and the check valves 136 fit into the lower cap 142. The piston 106 with the projections 114 is shown in side view and top view. Grooves 146 for accepting the piston rings are provided at two locations on the sidewall of the piston 106. The piston rings 108 and 110 are shown in side view and the ring 108 is shown in top view to reveal the split 148 therein that permits compression of the ring so that the ring can slide on the inside wall of the chamber. By comparing the rings 108 and 110, the ring 108 has a beveled outer edge to permit release from the groove 112.

The piston rings and the corresponding channels in the chamber walls are provided as position retaining means for the piston. Other position retaining means may be provided instead. The retaining means for the storage position should have enough resistance to movement of the piston to prevent unintentional activation of the device. The retaining means for the activated position of the piston should have enough resistance to movement to hold the piston in place against the force from the compressed gas. Choices of shapes and/or materials of the components will effect these and may be selected for a desired application.

In the embodiment of FIG. 4, a configuration to provide a 2:1 volume ratio of hydrogen to oxygen is provided. The upper chamber holds the hydrogen and the lower chamber holds the oxygen. A gas compression ratio of 3:1 is controlled by standoff structures 150 and 152 on the pistons 154 and 156. The piston position is controlled by two rings 158 and 160 fitting into upper or lower grooves 162 and 164 of the chamber wall. The upper ring 158 is beveled and the upper groove 162 is also beveled to release so as to permit movement of the piston. Neither the lower ring 160 nor the lower groove 164 is beveled, so that a positive lock is provided thereby. The gas flow is controlled by check valves 166.

The fuel cell membrane stack 168 occupies less than all the space between the outer wall of the device and the gas cylinder so that a space 170 is provided for water accumulation. The fuel cell membrane stack 168 is wrapped around the fuel cylinders. As in the prior figure, the upper cylinder 154 is shown in the upper or storage position with the upper ring 158 fitted into the upper groove 162 in the chamber wall. The lower piston is shown for purposes of illustration only in the lower position with the lower ring 160 in the non-beveled groove 164. As noted before, either both pistons are in the upper position or both are in the lower position during ordinary operation. The remaining parts of this embodiment are the same or functionally similar to those of FIG. 3A.

The illustrated fuel cell structure provides 3.6 volts DC at 0.6 amps (2 watts) for at least two minutes run time when constructed in a D size battery form factor.

Figure 5:
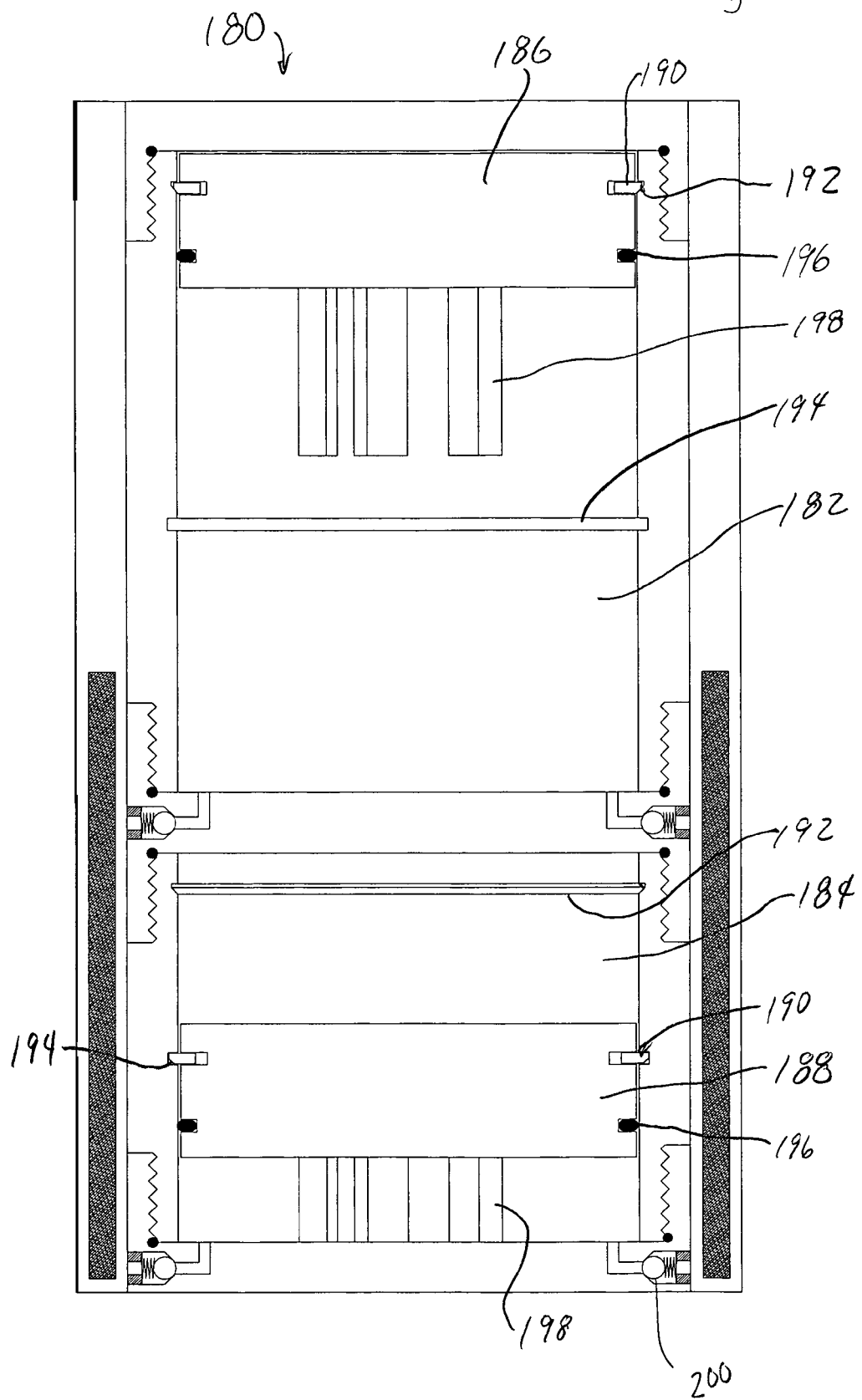
FIG. 5 is a side cross-sectional view of a third embodiment of the present fuel cell assembly.

In FIG. 5, the fuel cell device has the two chambers 182 and 184 each with a piston 186 and 188. The pistons 186 and 188 have a single piston ring 190 in a channel in the piston that engages an upper groove 192 when the piston is in the upper or storage position and a lower groove 194 that is engaged by the piston ring 190 when the piston is in the lower position or active position. An O-ring 196 is provided in a second channel in the pistons 186 and 188, respectively, to provide a seal with the sidewall of the chamber.

The pistons 186 and 188 have standoff structures 198 that provide a compression ratio of 3:1 for the gas upon activation. The gas ratio is 2:1 for the hydrogen and oxygen. Check valves 200 provide a threshold for controlling gas flow, four of which are preferably provided. Other structures and functions are similar or identical to the foregoing embodiments.

Figure 6:
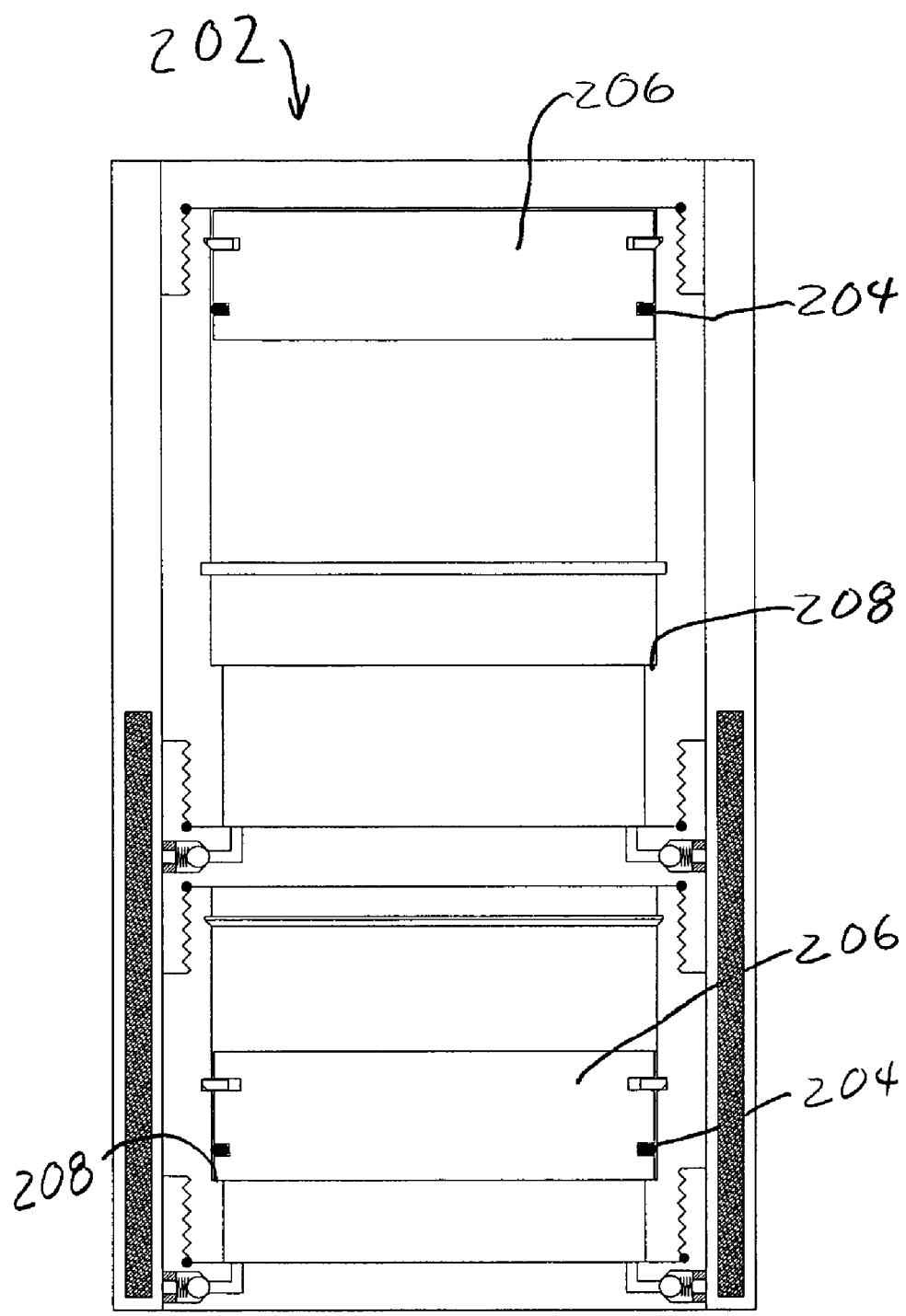
FIG. 6 is a side cross-sectional view of a fourth embodiment of the present fuel cell assembly.

FIG. 6 shows an embodiment of the fuel cell device that has the O-ring seal 204 of the previous embodiment for controlling gas leakage passed the pistons 206, but which is provided with a step 208 in the bore of the cylinder wall against which the pistons 206 rest when in the down or activated position. This eliminates the need for the standoff structure of the previous embodiments. The step 208 can be any change in diameter of the cylinder wall whether in a continuous ring around the cylinder wall or an intermittent structure or stop. The bore diameter may remain at the reduced diameter below the step or may be shaped to a larger diameter after the step. Other shapes of the cylinder wall are also possible in this and other embodiments. All other structures shown in FIG. 6 are the same or similar to previous embodiments.

Figure 7:
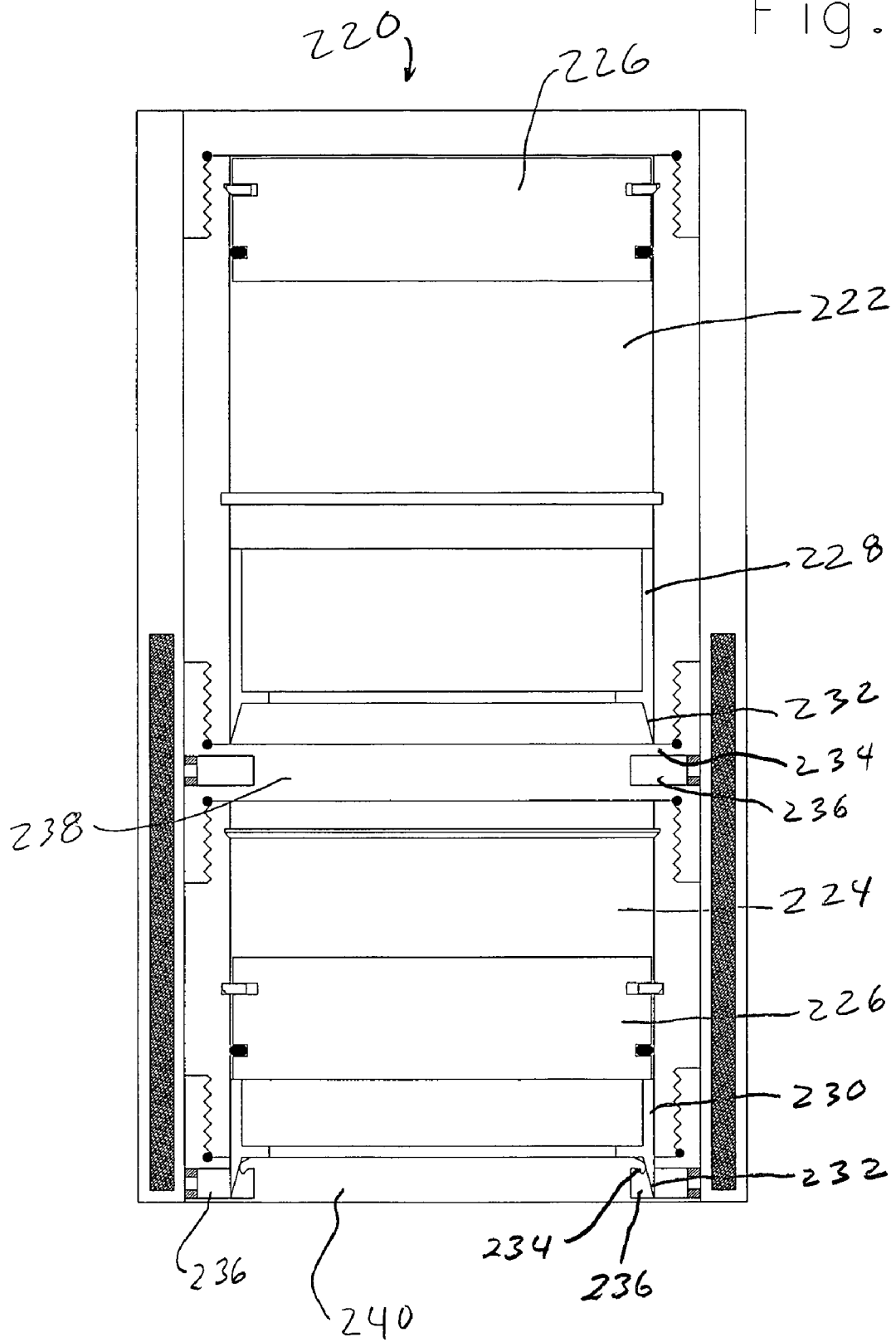
FIG. 7 is a side cross-sectional view of a fifth embodiment of the present fuel cell assembly.

Turning to FIG. 7, the fuel cell device 220 had the gas cylinders or chambers 222 and 224 with pistons 226 as before. Also in the cylinders or chambers is a sleeve 228 and 230 that defines the stop against which the piston 226 or 228 strikes when moving to the activated lower position. The sleeves 230 each have a lower knife edge 232. The knife edge 232 is adjacent to a thin wall portion 234 that provides a barrier between the cylinder and gas flow channels 236. The thin wall portion 234 is formed by leaving that portion unmachined during shaping of the cylinder end cap 238 and 240. It is noted that the end cap 238 forms an end of both chambers 222 and 224 in these embodiment, as well as in several previously mentioned embodiments.

The knife edge 232 pierces the thin wall portion 234 when the sleeve 230 is struck by the piston 226 or 228. This releases the compressed gas into the flow channels and to the fuel cell membrane. The knife edges 232 are preferably shaped to allow the gas to flow through the punctured thin wall portion 234 such as by having gaps, ridges or other shapes. The thin wall portion may be shaped to provide an opening to break away when pierced with the knife portions. The knife edges need not be sharp if such a break away member is provided. The sleeves 228 and 230 are of different lengths to provide for the 3:1 compression ratio of the gas chambers, which themselves have a ratio of 2:1 for the two gases.

Figure 8:
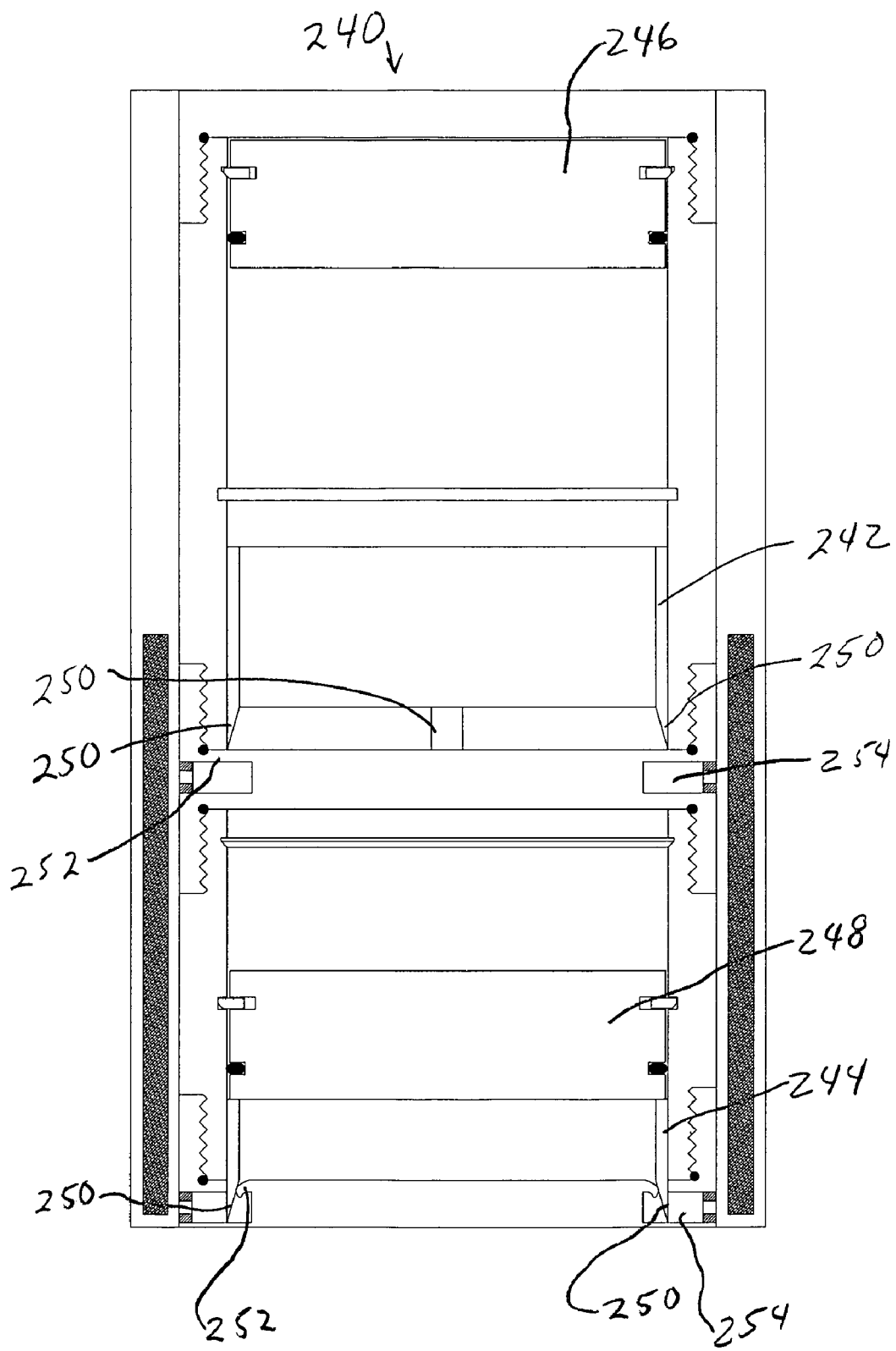
FIG. 8 is a side cross-sectional view of a sixth embodiment of the present fuel cell assembly.

FIG. 8 has an embodiment of the fuel cell device 240 in which sleeves 242 and 244 in the chambers provide stops for pistons 246 and 248 as before. The sleeves 242 and 244 have teeth 250 instead of the knife edge of the previous embodiment. The teeth 250 penetrate the thin wall portion 252 when the sleeve 242 or 244 is struck by the piston 246 or 248, respectively. The teeth 250 penetrate the thin walled portion 252 only at the positions where ports are provided for the flow channels 254. Other components and functions are the same or similar to previous embodiments.

Figure 9:
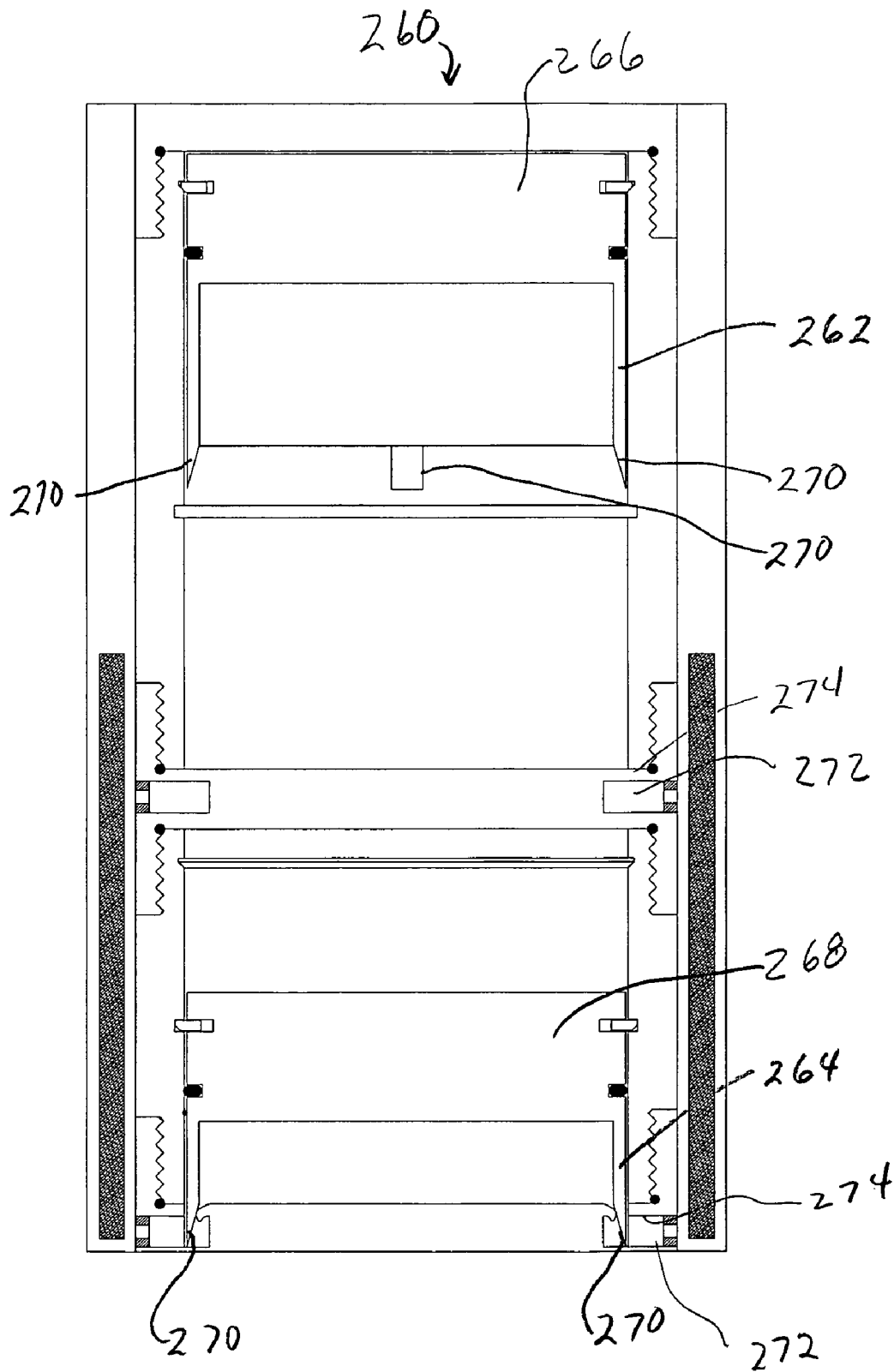
FIG. 9 is a side cross-sectional view of a seventh embodiment of the present fuel cell assembly.

In the view of FIG. 9, the embodiment of the fuel cell device 260 has the sleeves 262 and 264 connected to the underside of the pistons 266 and 268. The sleeves 262 and 264 have teeth 270 positioned at the flow channels 272 to pierce thin walled portions 274 to permit the gas flow to reach the fuel cell membrane. The sleeves 262 and 264 are also considered skirts on the pistons 266 and 268. All other features are as in the foregoing.

Figure 10:
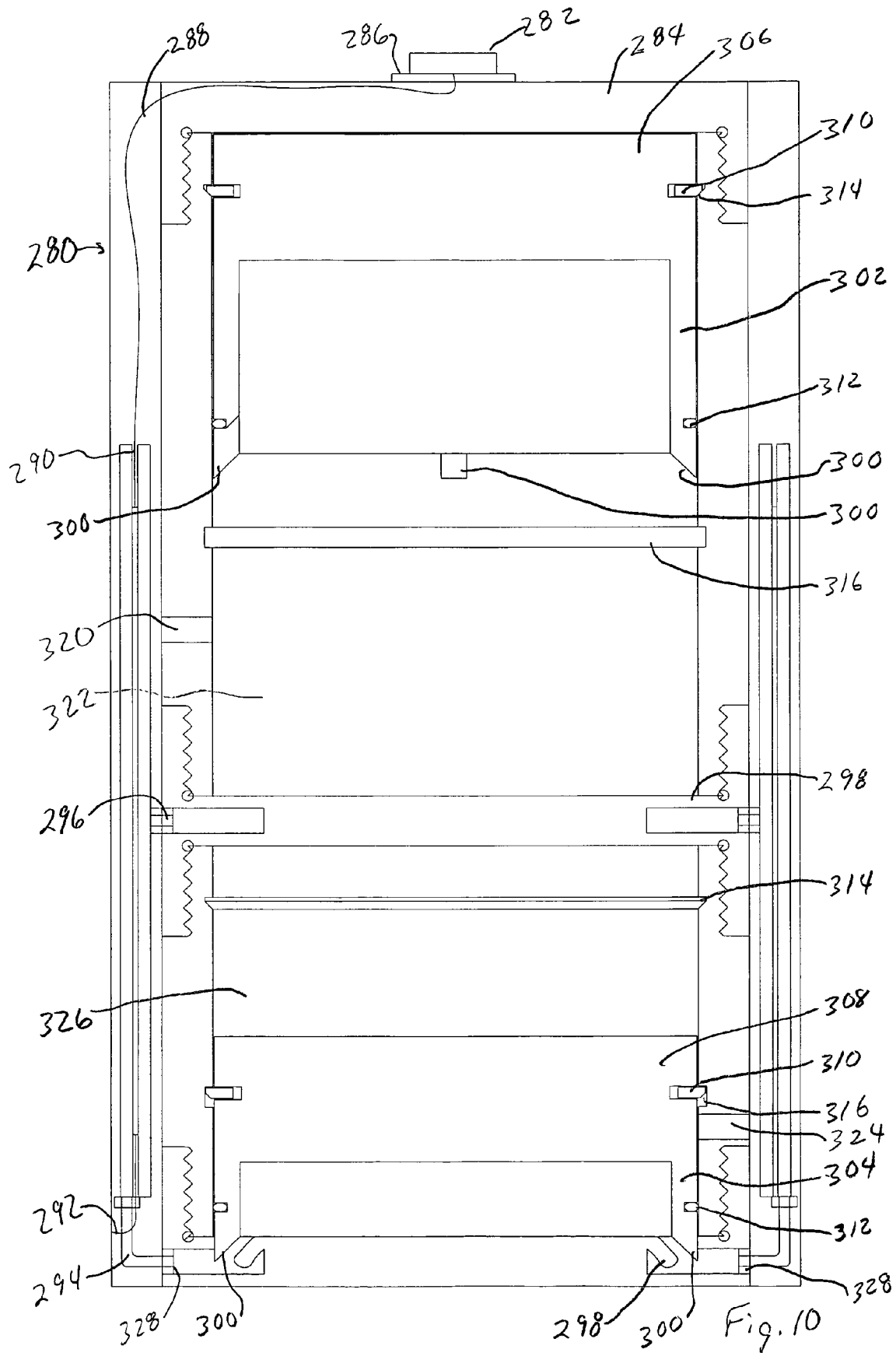
FIG. 10 is a side cross-sectional view of an eighth embodiment of the present fuel cell assembly.

FIG. 10 shows a preferred embodiment of the fuel cell device 280. Details are shown in this figure that are also present in the previous embodiments but have been omitted for the sake of clarity. A positive terminal 282 is mounted on the top of the housing 284, separated therefrom by an insulating member 286. A conductor 288, shown as a wire although as mentioned above may be in various configurations, extends from the positive terminal 282 to the fuel cell stack 290. A further lead 292 extends from the other end of the fuel cell stack 290 to the housing 284 to provide the ground connection for the circuit.

The fuel cell stack 290 is provided with the gases via flow channels 294 and 296 to carry the gases to the fuel cell stack when the thin wall portions 298 are pierced. The thin walled portions 298 are pierced by teeth 300 formed on lower edges of a skirt or sleeve 302 or 304 that are provided on the pistons 306 and 308. The pistons 306 and 308 have each have a piston ring 310 and an O-ring 312. The piston ring 310 moves from an upper groove 314 to a lower groove 316 upon activation. The lower groove is wider than the piston ring 310 and the upper groove 314 and the piston ring 310 are both beveled.

A charging port 320 is provided in a sidewall of the upper chamber 322 and a charging port 324 is provided in the lower chamber 326. A constricted orifice 328 is provided in the gas flow channels to control the gas flow. Grooves are provided on the teeth 300 to provide a gas flow path to the flow channels from the chambers.

In a D size battery form factor, this embodiment stores 11.6 CCs of hydrogen and 5.8 CCs of oxygen. If provides a 3:1 compression ratio for the gases upon activation (lowering of the pistons). Assuming a close to adiabatic compression and a pre-charge of 75 PSI, the operating pressure is just over 400 PSI and the gas will heat to a temperature of about 200 degrees F. in the chambers. This produces a power output of 2 Watts or more, at 3.6 Volts DC and 0.6 Amps for over 2 minutes.

In the embodiments of the inertial pumps shown, two compartments are constructed and placed in the cell. In one example, the two compartments are cylinders both about ⅞ of an inch in diameter and one of which is about 1½ inches in height and the other of which is about ¾ inch in height. These cylinders are stacked one on top of the other. One cylinder, generally the larger cylinder, is filled with or supplied with hydrogen gas, and the other, smaller cylinder is filled with or supplied with oxygen gas. Both gases are preferably under relatively low pressure, as for example, around 100 to 500 PSI (pounds per square inch). Higher pressures can be used if the fuel cell is required to give longer running times. Around the outside of the two cylinders is wrapped the PEM fuel cell stack, that is either continuous or in individual segments. Around the outside is a protective case.

Inside of each of the two cylinders is provided a high mass piston-type device. Two annular rings are fitted into channels in each piston, much like the piston rings found on a conventional automobile engine. The top ring of the two rings is constructed to pressure fit or frictionally engage the interior container wall to hold the piston at the top of the container. The bottom ring of the two rings similarly provides a pressure fit or friction fit to hold the piston at the bottom of the container. Alternatively, one ring is provided and configured to do both functions as a simplification.

The present device is preferably formed of a durable, gas impermeable material, such as a metal. In one example, the body of the device is formed of aluminum or an aluminum alloy, whereas in another example it is formed of steel or a steel alloy. The piston material should have sufficient mass to overcome the frictional forces holding it in the storage position plus any forces resulting from the piston ring or other position retaining means. As such, the piston may be formed of a heavy material, including lead, brass, tungsten, steel, platinum, alloys of any of the foregoing or other like materials or alloys.

The inertial pump of the present invention is a means of storing and delivering and processing of the gases to the polymer electrolyte membrane stack. To effect the internal compression of the two gases, the free floating, relatively dense (high mass) pistons are constructed and placed within a holder/container of the inertial pump in such a way as to be moveable therein under the influence of the acceleration forces involved in the munitions projectile launch. This results in the pistons moving from a first (or stored position) to a second (or pressure-imparting position) such that the piston acts to compress the gases.

By putting the fuel containers in the center of the fuel cell device, two forces can be utilized for work. The first force is the acceleration force, which forces the piston of the pump down into the pressure imparting, activated position. When the present fuel cell device is installed in a device that revolves, such as a munitions round or projectile, a second force comes into play. The second force is the centripetal force, which moves the gases to the outside of the structure where the PEM fuel cell stack is preferably positioned. By compressing the gases, the pressure and temperature of the gases in the inertial pump is increased. The compression of the gases as well as the centripetal forces move the hydrogen and oxygen to the fuel stack quickly and effectively. The generated heat also helps the chemical reaction in the fuel cell as described in further detail below. Thus, the inertial pump in accordance with the exemplary embodiments provide several advantageous features. As can be appreciated, the present device allows the hydrogen and oxygen to be kept isolated from the PEM fuel cell stack, but yet be quickly delivered to the fuel cell stack when desired.

Proper operation of this second ring is particularly important in some embodiments, since otherwise, once the acceleration of the projectile stops, the piston would reverse its rapid movement and slide back to the top of the container thereby reversing the heating and compression of the gas that is desired. Thus, the second ring holds the compression and heating at the value achieved by the downward movement of the piston as discussed in further detail below. Further, it doesn't allow the compression and heating to reverse, which is what would happen if the piston were allowed to return to the holding position.

On the bottom of the piston may be a series of projections or stand offs that control the extent of the downward movement of the piston so as to control the amount of compression given to the gases. Along with these major components are lines, passageways and/or check valves that are placed to direct the gas flow. In addition, suitable conductors (shown in FIG. 10, for example) for carrying the generated electricity are also provided. Also provided in some embodiments are a number of strategically placed open chambers to hold the water that is byproduct of the fuel cell process. If required by the design, different voltages could be generated in the fuel cell system by adding taps to the fuel cell stacks at the appropriate points.

The inertial switch described previously is one means of opening the flow so as to provide the required components to the fuel cell, for example, hydrogen and/or oxygen. The inertial switch initially provides a barrier to gas flow to the polymer electrolyte membrane cell and when the inertial switch is activated, the barrier no longer blocks the gas movement so that the gas will flow to the fuel cell membrane if the gas is at a pressure higher than the gas in the PEM stack. The piston of the inertial pump compresses the gas to create the pressure differential so that when the inertial switch opens, the gas components are provided to the PEM stack.

In addition to the above, by implementing the present invention, intense cold temperatures resulting from storage of the fuel cell in cold places or in arctic-type use can be overcome by the use of internal, adiabatic or isothermal compression of the gases, for example the hydrogen and oxygen, the effect of which is to produce heat in the compressed gases. The significant acceleration forces both compress the gases and heat them such that the resultant hot high pressure gases would be forced into the fuel cell stacks by both the acceleration force and centripetal force. Of course, cool and low pressure gas would be moved as well if the temperature increase or the pressure increase is not significant for what ever reason, for example, due to the effect the container will have on the process. However, because of the short time span of the compression process, it is expected that the process will be closer to the adiabatic.

The PEM fuel cell works best at approximately 80 degrees C. and that temperature would be attainable with the acceleration force generated at launch of the powered projectile. The chemical process of the fuel cell itself also generates heat, which causes the temperature of the device to approach that level. In long-term use fuel cell applications, some cooling may actually be required.

An additional advantage of this system is that the gases could be stored at a much lower pressure, which would minimize losses due to leakage, especially with respect to leakage of the hydrogen. It would also be possible to heat the gases with chemicals if the compression proves not to be sufficient.

FIGS. 2A-2C generally illustrate the operation of an example of an inertial pump in accordance with the present invention. In particular, it shows the inertial pump functioning as a storage device (FIG. 2A) in which gases are stored in the inertial pump, the inertial pump functioning as a compression pump (FIG. 2B) as the projectile in which the fuel cell is mounted is fired so as to begin compression of the gases, and the inertial pump functioning as a release switch (FIG. 2C) in the fully activated configuration where the inertial pump has been activated and the gases have been compressed by the pistons and are released to the polymer electrolyte membrane of the fuel cell.

In addition to the above describe implementation; alternative implementations may be employed with a check valve as a switch for the gas in place of the membrane. A check valve of one embodiment is designed to open at a certain threshold pressure. The storage pressure of the gas is lower than the threshold pressure so that the valve is shut during storage. When the piston moves in the piston chamber, the pressure of the gas goes up to a level exceeding the threshold and the valve opens. Any number of check valves may be utilized but either two or four check valves are currently considered an optimum number for each chamber. Embodiments having two check valves are shown in FIGS. 3A through 10. In another embodiment, a combination of the two different switch devices is provided for controlling gas flow, both a membrane switch and a check valve.

Controlling the hydrogen and oxygen gas flow once the device has been activated may be done through various means such as regulators or flow control orifices. The simplest and presently considered the optimal means is use of flow control orifices as shown in FIGS. 3 to 10.

In order to prevent or at least reduce the problem of hydrogen or oxygen gas "blow by" when the piston comes down, the fuel cell device of some embodiments further includes a seal at the bottom of the piston skirt. However, for the seal on the piston skirt to work or at least insure better performance, a lower retaining groove in the cylinder wall has a bevel or taper machined in the wall as shown in FIG. 5. This taper must be on the side closest to the bottom of the container and is provided to allow the "O" ring contained in the piston skirt to run past the groove without being damaged. A conventional rectangular groove is less desirable for this purpose as the edge may cut into the "O" ring thereby destroying the seal.

In preferred embodiments, another seal method is employed in lieu of an "O" ring on the piston skirt. In this embodiment, a sealing band is built into the bottom of the inside of the cylinder tank wall. On activation, the piston skirt moves down and the outside perimeter of the skirt engages the seal band thereby making a positive seal when the skirt reaches the bottom of the cylinder.

The seal band may be made of any suitable flexible material and need only seal the gas from escaping for the active time of the fuel cell device, which in some applications will be well under 5 minutes. When using this alternative, the probes on the piston skirt are of a slightly different design to allow the probes to pass by the seal without damaging it. This does not effect the operation of the probes in punching through the bottom seal material. The actual cutting edge of the probe is displaced toward the inside a sufficient distance such that it misses the sealing band upon its descent.

As an alternative to this embodiment, a deep groove is machined into the bottom of the tanks. This results in the avoidance of a requirement for a guiding device on the piston to insure that the probes on the bottom of the piston skirt are lined up with the ports. Specifically, for this alternative construction, there is no requirement for any guides as the ports are provided by a groove machined completely around the outside bottom of the tank insuring that the probes on the skirt always break through into this opening no matter where they hit or strike on the bottom. This simplifies the design and construction of the device by eliminating any piston guides and will therefore considerably reduces manufacturing costs.

To aid in connecting the gas collecting groove to the fuel cell assembly, it is advantageous to make an adapter ring that fits into a machined groove on the outside of the container. This adapter ring is used to connect the two tanks to the fuel cell assembly. The adapter ring is may be attached by many different methods but laser welding is presently viewed as the quickest and most reliable method to insure a positive gas seal. As an alternative to a separate adapter ring, the adapter ring can be built into the fuel cell manifold assembly.

Returning to the overall device construction, it is seen that for certain applications it is possible to store enough of both gases (in this case, hydrogen and oxygen) to run the fuel cell without need of compressing and heating either gas. However, these embodiments still need an effective gas seal and some apparatus for activation of the gas flow on launch of the projectile or upon some other activation event. In these situations, the inertial pump of the invention is essentially identical to the piston skirt design discussed above. In the alternative construction of the tank/piston design, the directional ports for conducting gas flow are altered from the illustrated embodiments which were described as being disposed in the bottom of the hydrogen and oxygen tanks to take the gas to the fuel cell after activation. For this alternative, all embodiments would be the same except that there is no top to the piston, or at least the piston has an opening therethrough. Instead, the piston can be a skirt-only device without a top on the piston. This construction would permit more gas to be stored in the tank and yet the piston skirt would perform essentially as shown in FIG. 3A. This piston skirt of this embodiment has a groove in the same location as the earlier piston such that the groove contains a retaining ring. However, no gas sealing "O" ring is required in this design.

In other embodiments, the gas storage cylinder design is identical for both gases. On activation the retaining ring collapses into the skirt and the sleeve moves down under the force of acceleration. At the bottom of the movement, the probes break through the seal material, and the gas flows to the fuel cell through ports or through the groove. In addition, the retaining ring engages the bottom cylinder groove just as in the earlier piston design to permanently lock the skirt in place.

In yet another alternative embodiment, in order to aid in the operation of the fuel cell a refinement is applied only to the hydrogen storage tank, although this alternative construction could also be used on the oxygen tank if it were determined that an additional vacuum was required in operation. The structural difference of this embodiment begins with a small port being placed in the middle of the top of the hydrogen tank on the inside as shown in FIG. 6. This port is designed with a sharp circular ring on the inside that extends or protrudes slightly into the hydrogen storage chamber. In a matching location on the piston, a counter bore is machined into the piston top. The counter bore receives an insert of a metal composed of a soft metal, such as lead or brass, that would make an effective gas seal. Alternatively, polymers could be used for the insert to form the gas seal.

When the tank is assembled, the piston is forced into the sharp ring of the port making a seal. As long as the piston is in its raised, storage position, the port of the tank is sealed. However once the projectile in which the fuel cell device is mounted is launched or fired, the piston is propelled downwardly so that the port is opened in the top of the tank. That port is constructed so as to be vented, for example by suitable machining or tubing directed to the fuel cell compartment.

In a further advantage of this construction, as the piston moves downwardly, it causes a vacuum to be formed in the chamber above piston. The effect of this vacuum is to pull or draw in any residual gas in the fuel cell chamber into the chamber above the piston. This vacuum effect results or aids in the flow of hydrogen and oxygen into the fuel cell, as well as aids in removal of water and water vapor bi-products of the fuel cell process. The result is that, since the withdrawal of the gas from below the piston occurs, more force is applied to the piston to punch through the bottom seal than in the previous embodiments. As an additional advantage, less constructional material is needed to fabricate this device, leaving a device that will be lighter and less expensive to fabricate and operate, while having enhanced performance.

As a further variation of this embodiment, the positions of the sharp ring seal and soft metal insert can be reversed. That is, placement of the soft metal or polymer sealing disk can be in the inside top of the tank top; while the sharp ring seal is placed in the top of the piston. The exhaust port stays in the tank top in the center.

In still a further alternative to this embodiment, two sealing rings and one sealing disk is provided in either the top of the piston or the inside top of the tank. However, in all these variations there is still only the requirement to have one port, which remains, in the top of the tank.

Figure 11:
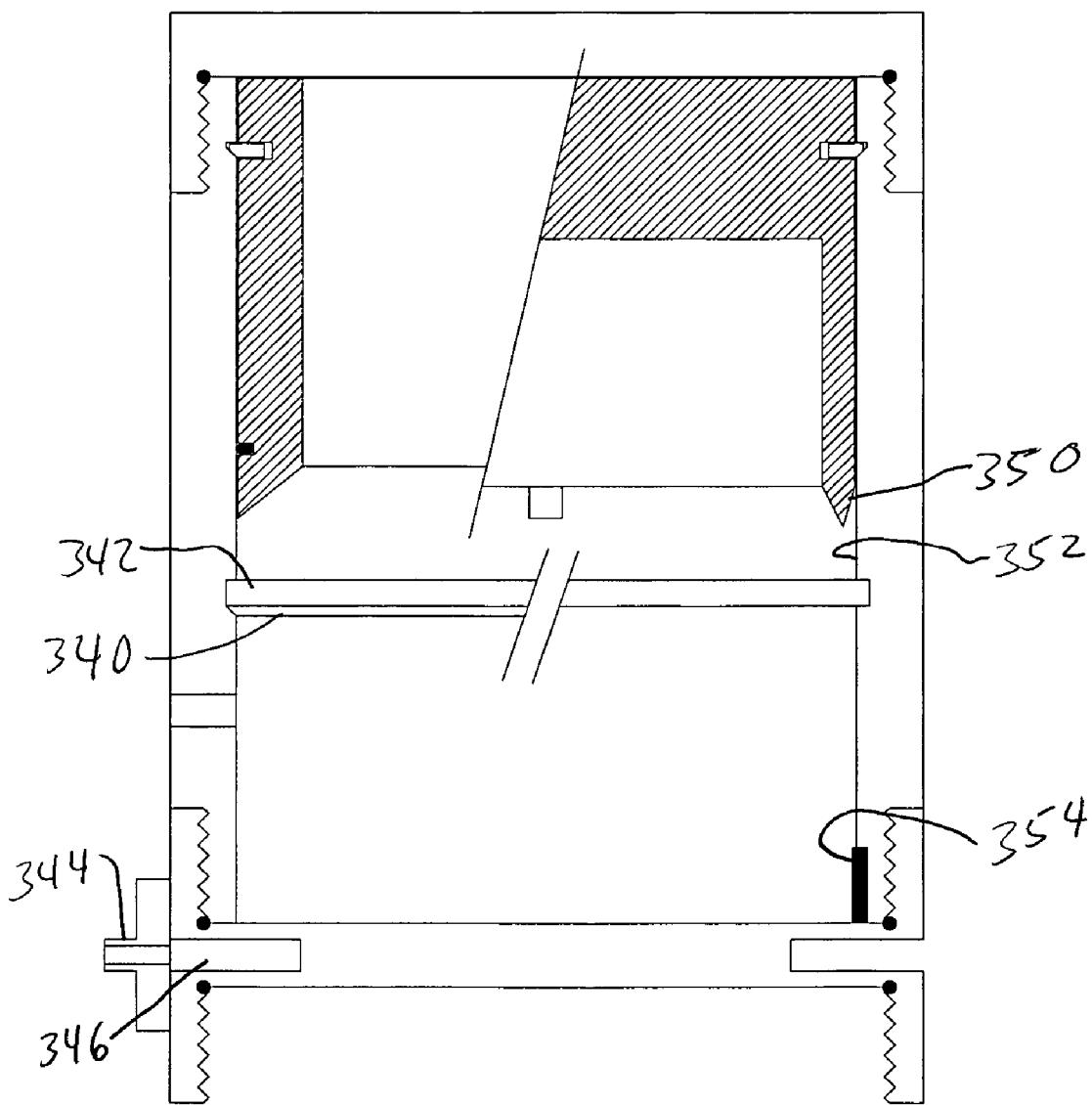
FIG. 11 is a side cross-sectional view of another embodiment of the inertial pump.

FIG. 11 provides two alternatives to the foregoing embodiments. On the left side of the drawing, a bevel 340 is provided on the lower groove 342. A flow channel member 344 is provided on the flow channel 346 to direct the gas flow. On the right side of the figure is a tooth structure 350 having a portion extending away from the sidewall 352 of the chamber. A lower gasket 354 is provided at the lower end of the chamber set into the side wall 352. This gasket 354 prevents the gas blow by that occurs with the gas under pressure and is provided in place of the O-ring.

Figure 12:
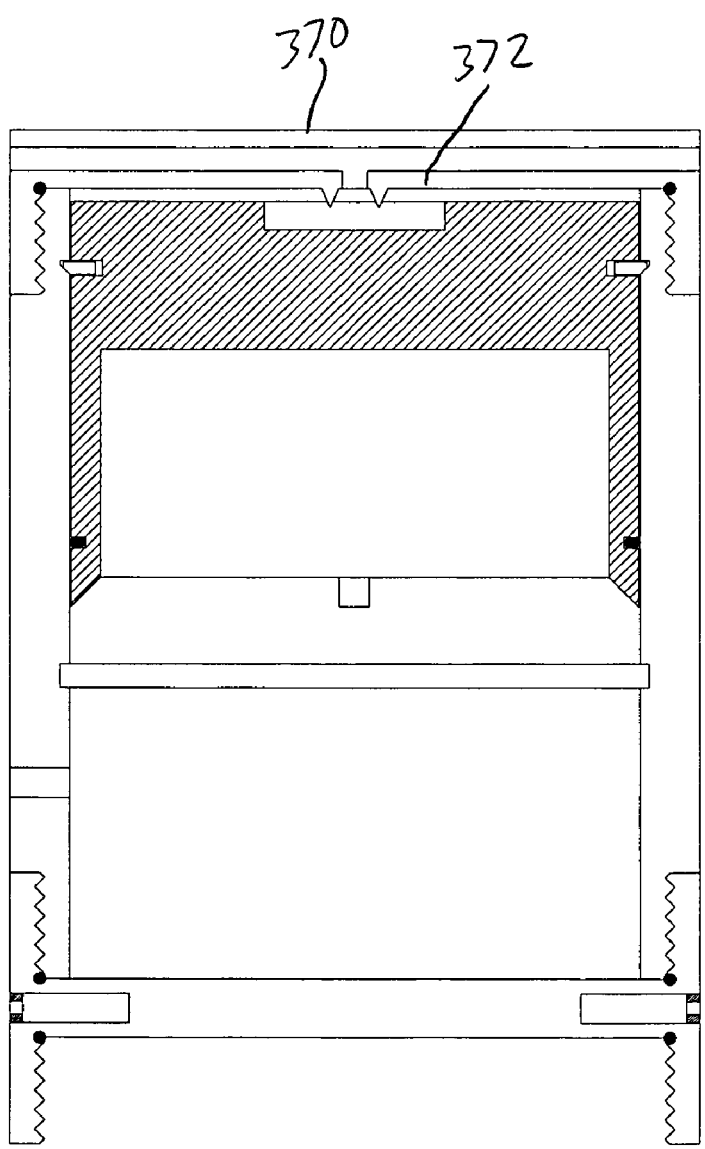
FIG. 12 is a side cross-sectional view of a further embodiment of the inertial pump.

Still another alternative construction for the embodiment of FIG. 12 involves a two piece top 370 to the storage tank. In the lower piece 372, in other words, the part that actually contains the gas, a machined pin is provided in the center facing into the tank. The machined pin has a flange machined into its top where it joins the container top with breakaway grooves also machined into it. The pin itself can be threaded on the free end. Prior to assembly, the pin is screwed or otherwise affixed or fastened into the top of the piston where a matching female tread or corresponding connection is placed. Other methods of attaching might also be possible for attachment of the pin, such as retaining clips and the like. The remainder of the top is then assembled to the tank using any convention method such as including laser welding.

In operation, when the projectile in which the fuel cell device is mounted is launched or fired, the acceleration force propels the piston downwardly as in all the previous embodiments. The difference in this embodiment is that a pin is affixed to the piston, which will pull down on the lower portion of the flange on the pin. The flange includes breakaway grooves machined into the flange, so that the pin breaks free thereby opening a path for the vacuum to pull the vapors and gases into the top of the tank, in a manner similar to the previously described embodiments. In this embodiment, it is not necessary to machine the upper retaining groove in the storage tank wall.

With proper design, the pin serves the same purpose as, but does not eliminate the need for the ring as the ring is still required to lock the piston in the down, or lowered, position after being activated. This embodiment, while somewhat complex to configure and manufacture, may offer a more effective seal than the soft disk arrangement.

With regard to still another embodiment of the invention, it is envisioned that for certain applications a configuration with one supply tank on top of the other supply tank design, in other words, a vertical design, might not be the desirable method of construction because of space restrictions in the end use. Specifically, a design with more width than height is a more desirable configuration.

Figure 13A:
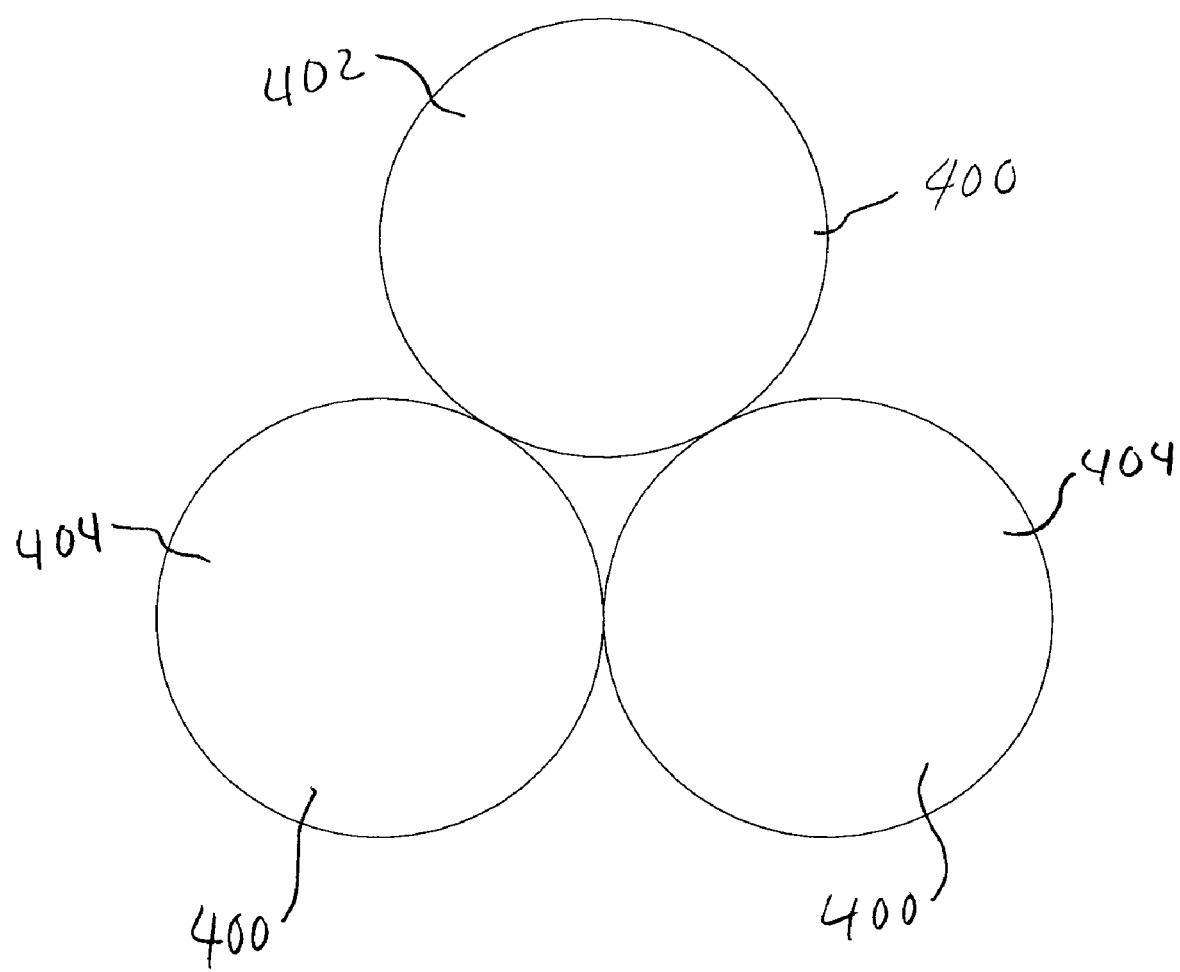
FIG. 13A is a schematic view of a first embodiment of external fuel tanks for use with the present fuel cell.

To achieve this configuration, an embodiment is provided having a somewhat different overall tank configuration. One alternative device (and method for its construction) of this embodiment includes three substantially identical tanks 400 placed in a side-by-side configuration as shown in FIG. 13A thus forming a ring of tanks 400 with their centers on a common radius from their common center. The tanks 400 touch one another at along a portion of the tank peripheries. As an example, one tank 402 can be for oxygen and the other two tanks 404 for hydrogen. This arrangement offers the right gas ratios for operation, but does require a third tank.

Figure 13B:
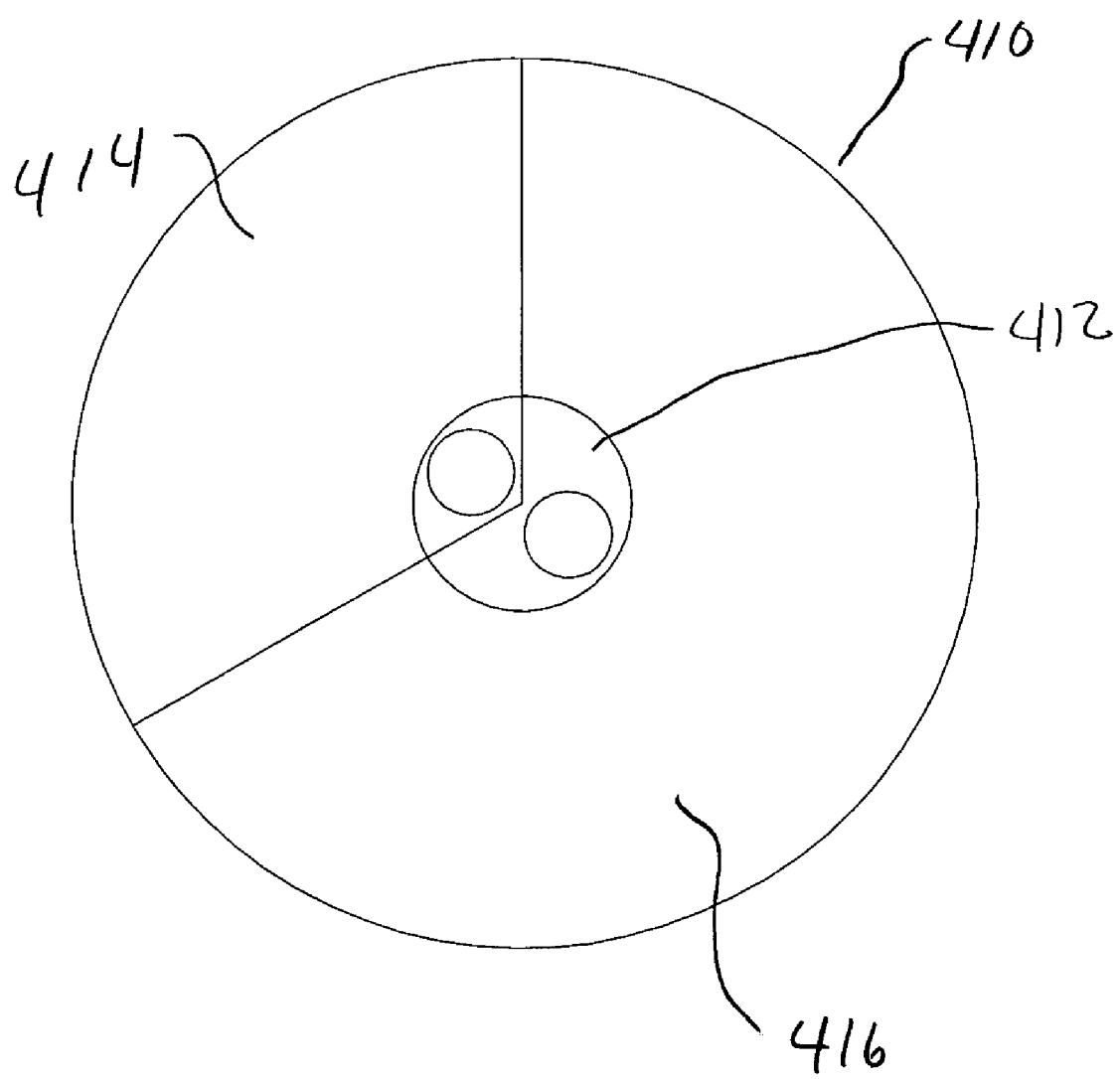
FIG. 13B is schematic view of a second embodiment of external fuel tanks for use with the present fuel cell.

As an alternative to the embodiment of FIG. 13A, the alternative construction of FIG. 13B provides better space utilization when compared with the three tanks configuration of FIG. 13A, and would also work well as a low profile design. In this embodiment, once the diameter of the tank 410 was determined, the tank is divided into three compartments 412, 414 and 416. The first compartment 412 is a circular compartment at the center for directing the gas flow to the fuel cell. The balance of the tank structure is outside that first compartment and surrounds the first compartment. The balance of the tank structure is further divided into two sections. One section 412 is about 120 degrees and the other section 416 is about 240 degrees in angular dimension, shown in FIG. 13B. This angular configuration of inner and outer compartments offers the proper 2 to 1 gas ratio for fuel cell operation.

To activate the device, two mini-piston probes, such as those illustrated in FIGS. 3 to 10 are provided in the center compartment. When these two mini-pistons are propelled downwardly under acceleration force, each breaks open membranes or other seals, again like those of FIGS. 3 to 10 to cause the gas to flow to the fuel cell from each of the two tank sections, shown in FIG. 13B, in a manner similar to the vertically structured tank designs above.

Another embodiment of this invention involves the delivery systems for fuel cell gases. That is, hydrogen and oxygen manifolds are constructed to bring the gases to the fuel cell for use in generating electricity. Advantageously, these manifolds are also used to support the fuel cell in the fuel cell device and also to protect the fuel cell from the high acceleration forces of projectile firing. Also built into the manifolds is preferably a means of delivering the hydrogen and oxygen to the fuel manifolds from the fuel storage tanks.

In this embodiment, three methods of construction of these manifolds are set forth. In all alternatives, these manifolds are formed as two hollow or porous cylinders. That is, an outer hollow or porous cylinder that fits between the outer shell of the fuel cell device and the fuel cell itself and an inner hollow or porous cylinder that fits between the fuel cell and the inertial pump assembly. These hollow or porous cylinders are similar in function to a section of tubing, as they both feed gases to the fuel cell. As such, the hollow or porous cylinder must allow for gas flow though its inner surface to the fuel cell catalyzed area.

On the inner hollow or porous cylinder the actual PEM fuel cell is positioned, see FIG. 8, while on the other side of the fuel cell is the second hollow or porous cylinder. The inner cylinder runs from the fuel cell on its outer wall to the fuel tank assembly on its inner wall. This construction is very similar to the other, second cylinder except the porous side for gas flow is on the outer wall. As there is slightly less surface area on the inner cylinder compared to the outer cylinder, it should be the cylinder that contains the hydrogen. The other hollow or porous cylinder, i.e., the "outer" one, should therefore be the one with the oxygen. The reason for this difference is that the oxygen reaction with the catalyst is slower than the reaction of the hydrogen. Therefore, in putting the oxygen gas in the manifold with the larger surface area one compensates slightly for that oxygen deficiency.

As previously stated, there are three methods used to make these manifolds. A first method is to machine the manifold from metal while a second method is to form the manifold by metal stamping. The third method is to use a solid porous material with an appropriate sealant on the outer surface. Each of these methods has its advantages and disadvantages. For example, the stamping method has the advantage of lower cost, but also requires the highest tooling requirement. In contrast, the machining method requires minimum tooling, but is more costly to fabricate each unit. The porous material method appears to be the best compromise as it would require less tooling than the stamping and each unit is less costly to make than in the machining method.

The alternative configuration just described, considered along with the optional configurations presented in the preceding paragraphs, offers considerable flexibility in addressing structural and performance design requirements. For example, this feature can be crucial to satisfying US Department of Defense requirements for a variety of sizes and shapes for its munitions batteries.

Finally, hydrogen gas, especially when under compression, has a tendency to leak through many materials over time. Since long storage life under pressure is a major issue in the employment of this invention, every effort must be made to minimize this loss. The wall thickness and the fit of all the joints must be carefully designed and machined to maximize this containment function.

Seals will also be added where appropriate, but in order to enhance the storage capability and minimize gas loss the inner surface of the storage tanks will need to be coated. This coating, which can take many forms, is important to the leakage issue. The coating could be formed by plating, vacuum deposition or be provided in the form of a native oxide. Each of these methods of formation, cause the coating material to be chemically bonded to the base material forming a layer that penetrates the base material surface.

Once the tanks are assembled and the gas is pumped in, the tanks must be sealed to insure a long storage life. For instance, an objective for some embodiments is to meet the 20-year storage requirement of the US Department of Defense. The various embodiments of the fuel cell device achieve this storage requirement. However, it is envisioned that there may be a requirement for at least one final sealing step. In particular, such a final sealing step may include forming a laser weld to all the joints. The disclosed construction lends itself to such a sealing step, and laser welding of all of the tank joins is preferred in the assembly and joining the various components of the present fuel cell device.

Of course, the inertial pump of the present invention is scalable to the extent that many fuel cell PEM storage sizes are possible, both small and large. For purpose of explanation and structural description, an exemplary micro fuel cell is contemplated at the size of a traditional "D" size battery. The PEM fuel cell technology utilized in a package of that size is more than capable of any of the power and duration times required by so-called smart mortars, artillery and tank rounds. Certainly, greater than two watts can be generated for more than two minutes with such a device.

The last elements required to complete the system are the electrical connections from the fuel cell membrane, the source of electric power, to the external device that will be using the power. In the embodiment of FIG. 10, the device is configured as a generic D size battery and the case is grounded as the negative terminal. A raised button is provided on the top of the case and is connected to the fuel cell membrane as the positive terminal. The positive terminal is insulated from the case to prevent shorts. In other form factors the power connections are made by conducting pins or screw terminals to suit the needs of the actual end use configuration.

Figure 14:
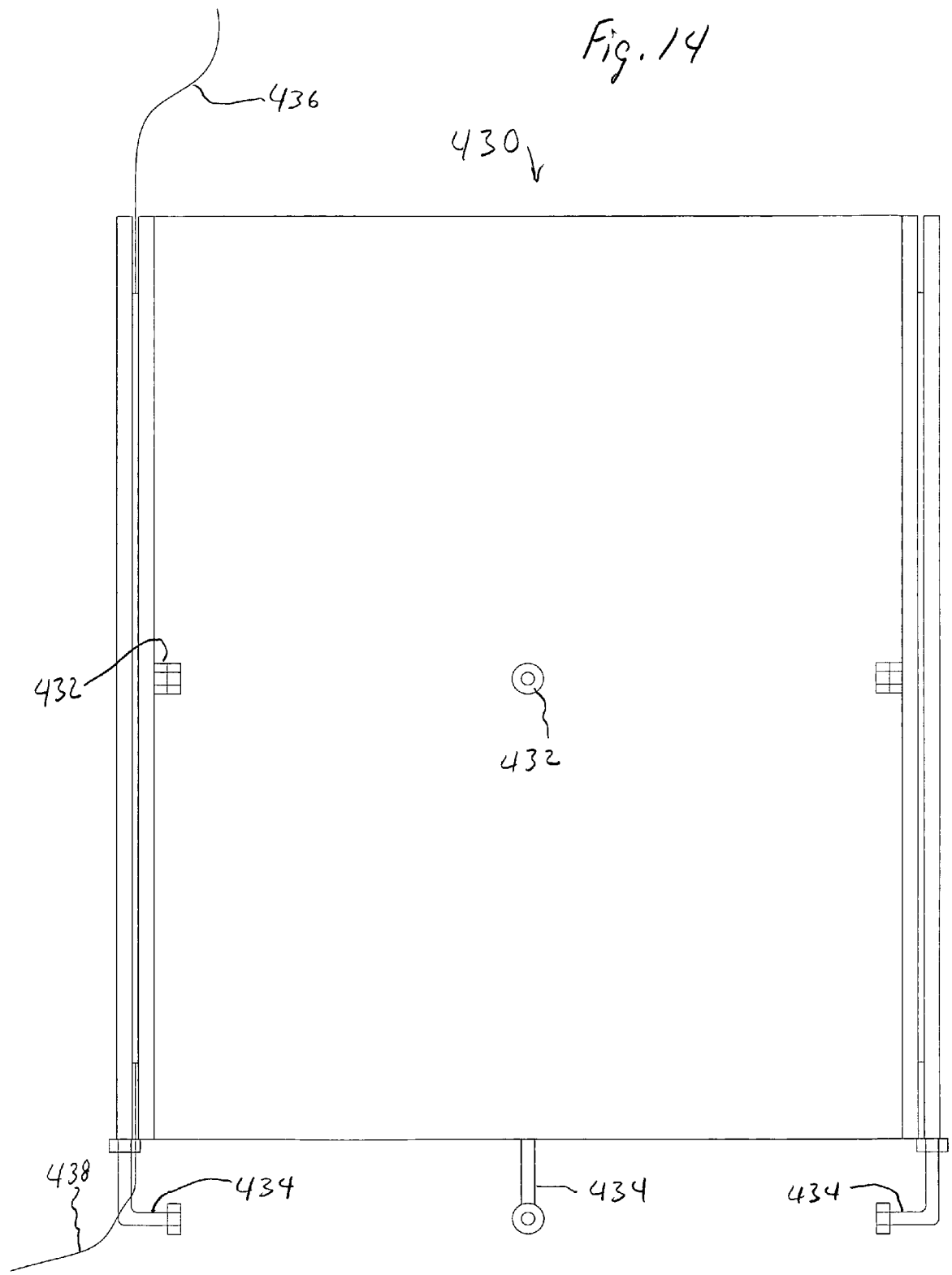
FIG. 14 is a side cross-sectional view of a cylinder portion for an inertial pump for an embodiment of the present fuel cell.

FIG. 14 shows a fuel cell structure 430 that fits into the outer housing of the fuel cell device. The fuel cell structure has gas ports 432 and 434 for carrying gas from the chambers to the fuel cell membrane. Positive and negative electrical leads 436 and 438 extend from the fuel cell sub-assemble and run to the appropriate connecting points on the completed device. FIG. 10 shows the connections to the case and positive terminal of the completed assembly.

The internal connections from the fuel cell anode and cathode terminals may be made by any suitable means, including wires, bus bars or flexible strips of conductive material. The connections are of a suitable size and insulated for proper operation. Other types of connections are possible and are within the scope of this invention as well.

APPENDIX A and APPENDIX B list various specifications and performance calculations for the inertial pump and components therefore in accordance with exemplary embodiments. In particular, dimensions of the piston and cylinder are provided as well as pressure after compression and temperature of hydrogen and oxygen. These performance calculations show the efficacy of the inertial pump of the present invention.

The present fuel cell device has been primarily described as operating to power munitions. The device is far more versatile than that, however, and can power many different types of devices or provide power to many different types of systems. Without modification, the disclosed device may be used for any number of one-time use applications, including: power to micro-pumps for delivering medicine to a remotely located patient, or devices not expected to be used on a regular basis such as emergency radio beacons as used in downed aircraft, stranded hikers or skiers and the like. Such life and death situations can result in a fatality if an emergency device has a dead battery. A reliable long term storage power supply is needed.

It is foreseeable that the present device may provide only the fuel in a storage chamber and the oxidizer may be available by exposure to air, for example. As such, the scope of the present invention extends in some embodiments to a device having a single gas storage chamber, a single piston and a flow control switch to selectively deliver the gas to a fuel cell membrane. The other side of the membrane is exposed to the air or to the environment in which it is located. The efficiency of such a single chambered device is likely to be lower than one providing the oxidizer under pressure, but where a compact size or reduction in parts, cost, weight or materials is important, such a construction may have great value.

While PEM fuel cell technology is referenced many times throughout this disclosure, the concept described herein is not intended to be limited to that technology only. Indeed, as appropriate to the specific application, any fuel cell technology would work in this configuration. PEM technology, however, is presently the best technology that is adaptable to miniaturization and lower cost.

The foregoing description discloses not only a fuel cell device but also a method of operating a fuel cell device and even a method for making a fuel cell device.

Of course, the inertial pump described above and shown in the appended figures are only illustrative examples of the present invention and the present invention is not limited thereto. In this regard, while various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

Although other modifications and changes may be suggested by those skilled in the art, it is the intention of the inventors to embody within the patent warranted hereon all changes and modifications as reasonably and properly come within the scope of their contribution to the art.

I claim:

1. A fuel cell device, comprising:
    a first chamber constructed so as to hold a quantity of a gas as stored gas in a first gas storage chamber;
    a second chamber constructed so as to hold a quantity of a gas as stored gas in a second gas storage chamber;
    a first piston in said first chamber, said first piston being movable between a first position and a second position, said second position compressing the gas in said first gas storage chamber;
    a second piston in said second chamber, said second piston being movable between a first position and a second position, said second position compressing the gas in said second gas storage chamber;
    a fuel cell membrane;
    a first flow channel from said first chamber to said fuel cell membrane, said first flow channel providing fluid communication of the stored gas in said first gas storage chamber to said fuel cell membrane when said first piston is in said second position;
    a second flow channel from said second chamber to said fuel cell membrane, said second flow channel providing fluid communication of the stored gas in said second gas storage chamber to said fuel cell membrane when said second piston is in said second position; and
    a flow control switch in at least one of said first flow channel and said second flow channel, said flow control switch having an initially closed position blocking said at least one of said first and second flow channels, said flow control switch being operable to an open position to open said at least one of said first and second flow channels, wherein said flow control switch includes at least one thin wall portion blocking flow through said at least one of said first flow channel and said second flow channel, a piercing member moveable by at least one of said first and second pistons to pierce said at least one thin wall portion to permit flow of a gas through said at least one of said first flow channel and said second flow channel.

2. A fuel cell device as claimed in claim 1, wherein said piercing member includes a sleeve in at least one of said first and second chambers, said sleeve being separate from said first and second pistons.

3. A fuel cell device as claimed in claim 1, wherein said piercing member is mounted on at least one of said first piston and said second piston.

4. A fuel cell device as claimed in claim 3, wherein said piercing member includes a skirt mounted on said at least one of said first piston and said second piston.

5. A fuel cell device, comprising:

a chamber constructed to hold a quantity of a gas;

a piston in said chamber, said piston being movable between a first position and a second position;

a fuel cell membrane;

a flow channel from said chamber to said fuel cell membrane; and a flow control switch in said flow channel, said flow control switch including a membrane closing said flow channel when in an intact condition and a piercing member mounted for movement between a first position and a second position, said second position of said piercing member piercing said membrane so as to permit flow through said flow channel, said piercing membrane being connected to said piston so as to move between said first position and said second position of said piercing member upon movement of said piston from said first position to said second position of said piston.

* * * * *